(12) United States Patent
Li et al.

(10) Patent No.: US 10,764,801 B2
(45) Date of Patent: Sep. 1, 2020

(54) DEVICE CONTROL METHOD AND APPARATUS

(71) Applicant: Huawei Technologies Co., Ltd., Shenzhen (CN)

(72) Inventors: Yan Li, Beijing (CN); Hui Ni, Beijing (CN); Yongcui Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/104,324

(22) Filed: Aug. 17, 2018

(65) Prior Publication Data

US 2019/0007880 A1 Jan. 3, 2019

Related U.S. Application Data

(63) Continuation of application No. PCT/CN2017/076985, filed on Mar. 16, 2017.

(30) Foreign Application Priority Data

May 13, 2016 (WO) ................ PCT/CN2016/082037

(51) Int. Cl.
*H04W 36/14* (2009.01)
*H04W 80/10* (2009.01)
(Continued)

(52) U.S. Cl.
CPC ....... *H04W 36/14* (2013.01); *H04W 28/0257* (2013.01); *H04W 36/34* (2013.01);
(Continued)

(58) Field of Classification Search
CPC ..... H04W 36/14; H04W 36/38; H04W 80/10; H04W 28/16; H04W 28/20; H04W 28/02;
(Continued)

(56) References Cited

U.S. PATENT DOCUMENTS 7,835,272 B1 * 11/2010 Johnson .............. H04L 41/0668
370/228
9,001,767 B1 * 4/2015 Gatewood ............. H04W 72/04
370/328

(Continued)

FOREIGN PATENT DOCUMENTS

| CN | 1956451 A | 5/2007 |
|---|---|---|
| CN | 101150773 A | 3/2008 |

(Continued)

OTHER PUBLICATIONS

3rd Generation Partnership Project; Technical Specification Group Services and System Aspects; General Packet Radio Service (GPRS) enhancements for Evolved Universal Terrestrial Radio Access Network (E-UTRAN) access (Release 13), 3GPP TS 23.401 V13.7.0 (Jun. 2016), 372 pages.

(Continued)

*Primary Examiner* — Warner Wong
(74) *Attorney, Agent, or Firm* — Slater Matsil, LLP

(57) ABSTRACT

Embodiments of the present disclosure provide a device control method and apparatus, and relate to the field of device control technologies. The method includes: determining a session attribute of user equipment UE; and sending the session attribute to a first access network AN accessed by the UE, where the session attribute is used by the first AN to control the UE.

28 Claims, 20 Drawing Sheets

(51) Int. Cl.
*H04W 36/34* (2009.01)
*H04W 28/02* (2009.01)
*H04W 36/38* (2009.01)
*H04W 88/14* (2009.01)
*H04W 72/12* (2009.01)
*H04W 28/12* (2009.01)

(52) U.S. Cl.
CPC ........... *H04W 36/38* (2013.01); *H04W 80/10* (2013.01); *H04W 28/12* (2013.01); *H04W 72/1263* (2013.01); *H04W 88/14* (2013.01)

(58) Field of Classification Search
CPC . H04W 28/10; H04W 28/12; H04W 72/1263; H04L 12/40065; H04L 2012/5632; H04L 2012/6456; H04L 41/0896; H04L 43/0888; H04L 47/10
See application file for complete search history.

(56) References Cited

U.S. PATENT DOCUMENTS

| | | | | |
|---|---|---|---|---|
| 9,185,643 | B2* | 11/2015 | Jouin | G06F 3/048 |
| 2008/0219207 | A1* | 9/2008 | Chen | H04L 45/00 370/328 |
| 2009/0199268 | A1 | 8/2009 | Ahmavaara et al. | |
| 2010/0046502 | A1* | 2/2010 | Lei | H04L 65/1069 370/352 |
| 2011/0116478 | A1 | 5/2011 | Zhang et al. | |
| 2011/0170506 | A1 | 7/2011 | Zisimopoulous et al. | |
| 2012/0033602 | A1 | 2/2012 | Guo et al. | |
| 2013/0303170 | A1* | 11/2013 | Siomina | G01S 5/0205 455/436 |
| 2013/0310052 | A1* | 11/2013 | Timus | H04W 72/0433 455/445 |
| 2014/0307707 | A1 | 10/2014 | Mestanov et al. | |
| 2015/0201364 | A1 | 7/2015 | Yamada et al. | |
| 2016/0142321 | A1* | 5/2016 | Gage | H04W 4/70 370/235 |
| 2016/0174110 | A1* | 6/2016 | Sharma | H04W 36/0022 370/331 |
| 2016/0219503 | A1 | 7/2016 | Kim et al. | |
| 2016/0366632 | A1* | 12/2016 | Cui | H04W 40/04 |
| 2017/0006499 | A1* | 1/2017 | Hampel | H04W 28/10 |
| 2017/0230891 | A1* | 8/2017 | Fang | H04W 40/22 |
| 2017/0318506 | A1 | 11/2017 | Mestanov et al. | |

FOREIGN PATENT DOCUMENTS

| | | |
|---|---|---|
| CN | 101242353 A | 8/2008 |
| CN | 101883321 A | 11/2010 |
| CN | 102111818 A | 6/2011 |
| CN | 105122884 A | 12/2015 |
| JP | 2010537529 A | 12/2010 |
| JP | 2011528877 A | 11/2011 |
| JP | 2015529407 A | 10/2015 |
| RU | 2480915 C2 | 4/2013 |
| WO | 2014193303 A1 | 12/2014 |
| WO | 2015037882 A1 | 3/2015 |

OTHER PUBLICATIONS

Alcatel-Lucent, "Discussion on EPS QoS GBR/MBR rate handling at the NAS and S1 Interface," 3GPP TSG CT WG1 Meeting #83, C1-131977, Chengdu, P.R. China, May 20-24, 2013, 6 pages.
3rd Generation Partnership Project; Technical Specification Group Radio Access Network; Evolved Universal Terrestrial Radio Access (E-UTRA) and Evolved Universal Terrestrial Radio Access Network( E-UTRAN); Overall description; Stage 2 (Release 13), 3GPP TS 36.300 V13.3.0 (Mar. 2016), 295 pages.
3rd Generation Partnership Project;Technical Specification Group Services and System Aspects; Study on Architecture for Next Generation System (Release 14), 3GPP TR 23.799 V0.4.0 (Apr. 2016), 96 pages.
3GPP TS 23.401, V13.6.1 (Mar. 2016), 3rd Generation Partnership Project; Technical Specification Group Services and System Aspects; General Packet Radio Service (GPRS) enhancements for Evolved Universal Terrestrial Radio Access Network (E-UTRAN) access (Release 13), Mar. 2016, 365 pages.
ETSI TS 123 401 V10.13.0 (Jan. 2015) LTE; General Packet Radio Service (GPRS)enhancements for Evolved Universal Terrestrial Radio Access Network (E-UTRAN)access (3GPP TS 23.401 version 10.13.0 Release 10), (found on Sep. 26, 2019),found in the Internet as https://www.etsi.org/deliver/etsi_ts/123400_123499/123401/10.13.00_60/ts_123401v101300p.pdf,total 280 pages.

\* cited by examiner

DEVICE CONTROL METHOD AND APPARATUS

CROSS-REFERENCE TO RELATED APPLICATIONS

This application is a continuation of International Application No. PCT/CN2017/076985, filed on Mar. 16, 2017, the disclosure of which claims priority to PCT Patent Application No. PCT/CN2016/082037, filed on May 13, 2016. The disclosures of the aforementioned applications are hereby incorporated by reference in their entireties.

TECHNICAL FIELD

Embodiments of the present disclosure relate to the field of device control technologies, and in particular, to a device control method and apparatus.

BACKGROUND

After a user equipment (UE) accesses a network, a network side needs to control the UE.

For example, when the UE moves, an access network (AN) determines, based on a handover restriction list of the UE, whether to perform cell handover on the UE. If the cell handover is to be performed, the AN hands over an evolved universal terrestrial radio access network radio access bearer (E-RAB) of the UE to a target AN. In the handover restriction list, a roaming or access restriction during moving of the UE is defined, including information such as a forbidden tracking area (Forbidden TA), a forbidden location area (Forbidden LA), and forbidden inter RATs.

In a process of implementing the present disclosure, the inventor finds that the foregoing device control method includes at least the following problems.

Because some radio access bearers in the UE may not need to be handed over to the target AN, the foregoing method cannot implement on-demand handover, and a particular quantity of radio resources are wasted during handover of a radio access bearer that does not need to be handed over.

SUMMARY

To resolve a problem that a particular quantity of radio resources are wasted and on-demand mobility management cannot be implemented, embodiments of the present disclosure provide a device control method and apparatus. The technical solutions are as follows.

According to a first aspect, a device control method is provided and used in a control plane (CP) network element. The device control method includes: determining a session attribute of a UE. The method also includes sending the session attribute to a first AN accessed by the UE, where the session attribute is used by the first AN to control the UE.

The CP sends the session attribute of the UE to the first AN accessed by the UE, so that the first AN may control the UE based on the session attribute. The first AN may control the UE at a session granularity based on the session attribute. In this way, the foregoing method resolves problems that because only UE-granularity control can be performed on UE, a particular quantity of radio resources are wasted when mobility management is performed on the UE and on-demand mobility management cannot be performed, thereby controlling the UE at a smaller granularity (e.g. a session granularity), improving accuracy and flexibility of controlling the UE, and reducing radio resources required in a control process.

Optionally, in a first possible implementation of the first aspect, when at least two sessions exist between the UE and a data network (DN), the step of determining a session attribute of UE includes: determining a correspondence between a session attribute of each of the at least two sessions and each bearer in the UE, where at least one bearer corresponds to a session. Correspondingly, the step of sending the session attribute to a first AN accessed by the UE may include: sending the session attribute to the first AN based on the correspondence.

Optionally, with reference to the first possible implementation of the first aspect, in a second possible implementation, the bearer is a single service flow or an aggregate of at least two service flows.

Optionally, with reference to the first aspect, the first possible implementation of the first aspect, or the second possible implementation of the first aspect, in a third possible implementation, the step of determining a session attribute of UE may include the following four possible implementations:

In a first manner, a control request sent by the UE via the first AN is received, and the session attribute of the UE is determined based on service requirement information carried in the control request, where the control request is an access request, a connection establishment request, or a service request; and the access request is a request sent by the UE in a network registration procedure, for example, the access request may be a request from the UE via the first AN when the UE is powered on; the connection establishment request is a request for requesting, by the UE, to establish a network connection, for example, the connection establishment request may be an establishment request for requesting to establish a DN connection to the DN; and the service request is a request for establishing a signaling connection for each interface of a radio access network and is used to enable the UE to be switched from an idle state to a connected state.

In a second manner, the pre-configured session attribute of the UE is obtained.

In a third manner, an obtaining request is sent to a subscription server, and the session attribute returned by the subscription server is received.

In a fourth manner, the session attribute sent by a policy decision network element is received; or an index sent by the policy decision network element is received, and the session attribute corresponding to the index is determined.

Optionally, with reference to the first aspect, the first possible implementation of the first aspect, the second possible implementation of the first aspect, or the third possible implementation of the first aspect, in a fourth possible implementation, the step of sending the session attribute to a first AN may include: sending, to the first AN, a context connection establishment request that carries the session attribute; or sending, to the first AN, a context modification request that carries the session attribute.

Optionally, with reference to the first aspect, the first possible implementation of the first aspect, the second possible implementation of the first aspect, the third possible implementation of the first aspect, or the fourth possible implementation of the first aspect, in a fifth possible implementation, the session attribute includes one or more of the following: a service area corresponding to a session and/or a bandwidth constraint condition corresponding to a session.

The service area corresponding to the session indicates a release restriction of a bearer during moving of the UE. For example, if a DN connection attribute is an attribute corresponding to a service flow 1, and the service flow 1 is released during handover of the UE, the DN connection attribute corresponding to the service flow 1 is released during the handover of the UE. The bandwidth constraint condition corresponding to a session may include a bandwidth rate, a delay, or the like. For example, the bandwidth constraint condition includes that a bandwidth is 100 kb/s.

According to a second aspect, a device control method is provided and used in a first AN, and the device control method includes: receiving a session attribute of UE sent by a CP; and controlling the UE based on the session attribute.

The session attribute of the UE sent by the CP is received, and the UE is controlled based on the session attribute. The first AN may control the UE at a session granularity based on the session attribute. In this way, the foregoing method resolves problems that because only UE-granularity control can be performed on UE, a particular quantity of radio resources are wasted when mobility management is performed on the UE and on-demand mobility management cannot be performed, thereby controlling the UE at a smaller granularity (e.g. a session granularity), improving accuracy and flexibility of controlling the UE, and reducing radio resources required in a control process.

Optionally, in a first possible implementation of the second aspect, when at least two sessions exist between the UE and a DN, the step of receiving a session attribute of UE sent by a CP may include: receiving the session attribute of the UE sent by the CP based on a correspondence, where the correspondence includes a correspondence between a session attribute of each of the at least two sessions and each bearer in the UE. Correspondingly, the controlling the UE based on the session attribute includes: controlling the UE based on the correspondence.

With reference to the second aspect or the first possible implementation of the second aspect, in a second possible implementation, the session attribute includes one or more of the following: a service area corresponding to a session and a bandwidth constraint condition corresponding to a session, where the session attribute is similar to the session attribute described in the first aspect.

In a third possible implementation of the second aspect, when a first session exists between the UE and a DN, and the session attribute includes a service area corresponding to the first session, the step of controlling the UE based on the session attribute may include: before the UE is handed over from the first AN to a second AN, sending, by the first AN to the second AN, a handover request message that carries the session attribute, where the handover request message is used to instruct the second AN to trigger the CP to release the first session when the second AN determines, based on the session attribute, that the first session does not need to be handed over; or before the UE is handed over from the first AN to a second AN, if the first AN determines, based on the session attribute, that the first session does not need to be handed over, sending, by the first AN, a handover request message to the second AN, where the handover request message carries a session identity of the first session that does not need to be handed over, and the handover request message is used to instruct the second AN to trigger the CP to release the first session; or before the UE is handed over from the first AN to a second AN, if the first AN determines, based on the session attribute, that the first session does not need to be handed over, sending, by the first AN, indication information to the CP, where the indication information is used to instruct the CP to release the first session.

With reference to the first possible implementation of the second aspect, in a fourth possible implementation, when the at least two sessions exist between the UE and the data network DN, and the session attribute includes a service area corresponding to each of the at least two sessions, the controlling the UE based on the session attribute includes: before the UE is handed over from the first AN to a second AN, sending, by the first AN to the second AN, a handover request message that carries the session attribute, where the handover request message is used to instruct the second AN to determine a session that needs to be handed over and a session that does not need to be handed over, establish a radio resource corresponding to the session that needs to be handed over, and trigger the CP to release the session that does not need to be handed over; or before the UE is handed over from the first AN to a second AN, determining, by the first AN based on the session attribute, a session that does not need to be handed over, and sending a handover request message to the second AN, where the handover request message carries context information of a session that needs to be handed over and a session identity of the session that does not need to be handed over, and the handover request message is used to instruct the second AN to establish a radio resource corresponding to the session that needs to be handed over, and trigger the CP to release the session that does not need to be handed over; or before the UE is handed over from the first AN to a second AN, if the first AN determines, based on the session attribute, a session that does not need to be handed over, sending, by the first AN, indication information to the CP, so that the CP releases a bearer of the session in the at least two sessions that does not need to be handed over.

When an AN performs mobility management on the UE based on the session attribute, the AN may first delete a radio resource corresponding to a session that requires no mobility management, thereby reducing radio resources required in a handover procedure of the UE.

In a fifth possible implementation of the second aspect, when a second session exists between the UE and a data network DN, and the session attribute includes a bandwidth constraint condition corresponding to the second session, the controlling the UE based on the session attribute includes: performing, by the first AN based on the bandwidth constraint condition corresponding to the second session in the session attribute, bandwidth constraint on a user packet received by the UE.

With reference to the first possible implementation of the second aspect, in a sixth possible implementation, when the at least two sessions exist between the UE and the data network DN, and the session attribute includes a bandwidth constraint condition corresponding to each of the at least two sessions, the controlling the UE based on the session attribute includes: determining a bearer, corresponding to a user packet received by the UE, in bearers of the at least two sessions; obtaining, based on the correspondence, a session attribute corresponding to the determined bearer; and performing bandwidth constraint on the user packet based on a bandwidth constraint condition corresponding to a session in the obtained session attribute.

The first AN performs QoS control on the UE based on the session attribute, so that each session can be controlled, and control flexibility and accuracy are further improved.

With reference to the first possible implementation of the second aspect, in a seventh possible implementation, when the at least two sessions exist between the UE and the data network DN, and the session attribute includes a bandwidth constraint condition corresponding to each of the at least two sessions, the controlling the UE based on the session attribute includes: calculating, based on the bandwidth constraint condition corresponding to each session, a sum of bandwidth constraint conditions corresponding to the sessions in the UE; obtaining, from the CP, a subscribed bandwidth constraint condition of the user packet; and when the sum of bandwidth constraint conditions is greater than the subscribed bandwidth constraint condition of the user packet, performing, based on the subscribed bandwidth constraint condition of the user packet, bandwidth constraint on a user packet received by the UE; or when the sum of bandwidth constraint conditions is less than or equal to the subscribed bandwidth constraint condition of the user packet, performing, based on the sum of bandwidth constraint conditions, bandwidth constraint on a user packet received by the UE.

Optionally, with reference to the second aspect, the first possible implementation of the second aspect, the second possible implementation of the second aspect, the third possible implementation of the second aspect, the fourth possible implementation of the second aspect, the fifth possible implementation of the second aspect, the sixth possible implementation of the second aspect, or the seventh possible implementation of the second aspect, in an eighth possible implementation, the receiving a session attribute of user equipment UE sent by a control plane CP network element includes: receiving a context establishment request that is sent by the CP and that carries the session attribute; or receiving a context modification request that is sent by the CP and that carries the session attribute.

According to a third aspect, a device control method is provided and used in a CP. The method includes: sending, by the CP, a first correspondence to a first AN accessed by a UE, where the first correspondence includes a correspondence between a network identifier and a service area. The method also includes sending a second correspondence to the first AN.

The CP sends the first correspondence and the second correspondence to the first AN, so that the first AN can determine, based on the first correspondence and the second correspondence, a session attribute of the UE accessing the first AN, and further control the UE based on the session attribute of the UE. The CP may control the UE at a session granularity based on the session attribute. In this way, the foregoing method resolves problems that because only UE-granularity control can be performed on UE, a particular quantity of radio resources are wasted when mobility management is performed on the UE and on-demand mobility management cannot be performed, thereby controlling the UE at a smaller granularity (e.g. a session granularity), improving accuracy and flexibility of controlling the UE, and reducing radio resources required in a control process.

In a first possible implementation, the sending, by a CP, a first correspondence to a first AN accessed by user equipment UE includes: sending, to the first AN after the CP receives a device connection establishment request from the first AN, a connection establishment response that carries the first correspondence.

With reference to the third aspect or the first possible implementation of the third aspect, in a second possible implementation, the sending, by the CP, a second correspondence to the first AN includes: sending, by the CP to the first AN, a context establishment request that carries the second correspondence.

According to a fourth aspect, a device control method is provided and used in a first AN. The method includes: receiving, by the first AN, a first correspondence and a second correspondence that are sent by a CP, where the first correspondence includes a correspondence between a network identifier and a service area, and the second correspondence includes a correspondence between a session identity of a session in user equipment UE accessing the first AN and a network identifier. The method also includes determining, by the first AN, a session attribute of the UE based on the first correspondence and the second correspondence, and controlling, by the first AN, the UE based on the session attribute.

According to a fifth aspect, a device control method is provided and used in a second AN. The method includes: receiving, by the second AN, a handover request message that is sent by a first AN and that carries a session attribute, where the session attribute is a session attribute of a session in UE accessing the first AN. The method also includes determining, by the second AN based on the session attribute, a session that needs to be handed over and a session that does not need to be handed over. The method also includes establishing, by the second AN, a radio resource corresponding to the session that needs to be handed over, and triggering a CP to release the session that does not need to be handed over.

According to a sixth aspect, a device control method is provided and used in a second AN. The method includes: receiving, by the second AN, a handover request message sent by a first AN, where the handover request message carries context information of a session that needs to be handed over and a session identity of a session that does not need to be handed over. The method also includes establishing, by the second AN, a radio resource corresponding to the session that needs to be handed over, and triggering a CP to release the session that does not need to be handed over.

According to a seventh aspect, a device control method is provided and used in a CP. The method includes: determining, by the CP, a session attribute of user equipment UE. The method also includes receiving, by the CP, location information of a second AN from a first AN accessed by the UE. The method also includes detecting, by the CP based on the session attribute and the location information, whether a session in the UE needs to be handed over; and releasing, by the CP, the session in the UE if the session does not need to be handed over.

The CP determines the session attribute of the UE, receives the location information of the second AN that is sent by the first AN accessed by the UE, and releases, based on the session attribute and the location information, the session that does not need to be handed over in a session of the UE. The CP may control the UE at a session granularity based on the session attribute. In this way, the foregoing method resolves problems that because only UE-granularity control can be performed on UE, a particular quantity of radio resources are wasted when mobility management is performed on the UE and on-demand mobility management cannot be performed, thereby controlling the UE at a smaller granularity (e.g. a session granularity), improving accuracy and flexibility of controlling the UE, and reducing radio resources required in a control process.

In a first possible implementation, the method further includes: sending, by the CP, a subscription request to the first AN, where the subscription request is used to instruct the first AN to send the location information of the second AN to the CP before the UE is handed over from the first AN to the second AN.

According to an eighth aspect, a device control method is provided and used in a first AN. The method includes: receiving, by the first AN, a subscription request sent by a control plane CP network element. The method also includes sending, by the first AN when determining to hand over user equipment UE to a second AN, location information of the second AN to the CP based on the subscription request, where the location information is used to determine a session that does not need to be handed over.

According to a ninth aspect, a device control apparatus is provided, where the device control apparatus is used in a CP, the device control apparatus includes a processor and a transmitter connected to the processor, the processor is configured to execute an instruction, and the processor implements the device control method in the first aspect by executing the instruction.

According to a tenth aspect, a device control apparatus is provided, where the device control apparatus is used in a first AN, the device control apparatus includes a processor and a receiver connected to the processor, the processor is configured to execute an instruction, and the processor implements the device control method in the second aspect by executing the instruction.

According to an eleventh aspect, a device control apparatus is provided, where the device control apparatus is used in a CP, the device control apparatus includes a processor and a transmitter connected to the processor, the processor is configured to execute an instruction, and the processor implements the device control method in the third aspect by executing the instruction.

According to a twelfth aspect, a device control apparatus is provided, where the device control apparatus is used in a first AN, the device control apparatus includes a processor and a receiver connected to the processor, the processor is configured to execute an instruction, and the processor implements the device control method in the fourth aspect by executing the instruction.

According to a thirteenth aspect, a device control apparatus is provided, where the device control apparatus is used in a second AN, the device control apparatus includes a processor and a transmitter connected to the processor, the processor is configured to execute an instruction, and the processor implements the device control method in the fifth aspect by executing the instruction.

According to a fourteenth aspect, a device control apparatus is provided, where the device control apparatus is used in a second AN, the device control apparatus includes a processor and a receiver connected to the processor, the processor is configured to execute an instruction, and the processor implements the device control method in the sixth aspect by executing the instruction.

According to a fifteenth aspect, a device control apparatus is provided, where the device control apparatus is used in a CP, the device control apparatus includes a processor and a receiver connected to the processor, the processor is configured to execute an instruction, and the processor implements the device control method in the seventh aspect by executing the instruction.

According to a sixteenth aspect, a device control apparatus is provided, where the device control apparatus is used in a first AN, the device control apparatus includes a processor and a receiver connected to the processor, the processor is configured to execute an instruction, and the processor implements the device control method in the eighth aspect by executing the instruction.

According to a seventeenth aspect, a device control apparatus is provided, where the device control apparatus is used in a CP, the device control apparatus includes at least one unit, and the at least one unit is configured to implement the device control method provided in the first aspect.

In the foregoing aspects, the session attribute includes one or more of the following: a service area corresponding to a session and/or a bandwidth constraint condition corresponding to a session.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present disclosure clearer, the following further describes the implementations of the present disclosure in detail with reference to the accompanying drawings.

An evolved packet system (EPS) includes two parts: an AN and a core network. The AN is an evolved universal terrestrial radio access network (E-UTRAN) and is used to provide a radio access function for UE. The evolved packet core (EPC) mainly includes the following several key logical network elements: a mobility management entity (MME), a serving gateway (SGW), a packet data network gateway (PGW), a home subscriber server (HSS), and a policy and charging rules function (PCRF). The MME mainly completes processing of a signaling plane function, such as user authentication, handover, mobility management of the UE in an idle state, or management of a user context and a bearer. The SGW is a mobility anchor when the UE is handed over between local eNodeBs, and is configured to route and forward packet data and provide a function related to lawful interception. The PGW is a gateway connected to an external data network, a user plane anchor between a 3rd Generation Partnership Project (3GPP) access network and a non-3GPP access network, and responsible for functions such as user address assignment, execution of a policy control and charging rule, and lawful interception. The HSS is configured to store subscription information of a user. The logical network elements, that is, the SGW and the PGW, may be separated or may be integrated. The PCRF provides a policy and charging rule.

Optionally, UE may access an external data network by connecting to the PGW to create a DN connection. For example, the UE is connected to the PGW to create a packet data network (PDN) connection, to access an external packet data network. The PDN may be the Internet, a virtual private network (VPN), an Internet Protocol multimedia service (IMS) network, a Wireless Application Protocol (WAP) network provided by an operator, or the like. Optionally, the UE may create at least two DN connections. The at least two DN connections may be connections to a same anchor PGW or may be connections to different anchors, and the at least two DN connections are connections to a same PDN. This is not limited in the embodiments.

Figure 1A:
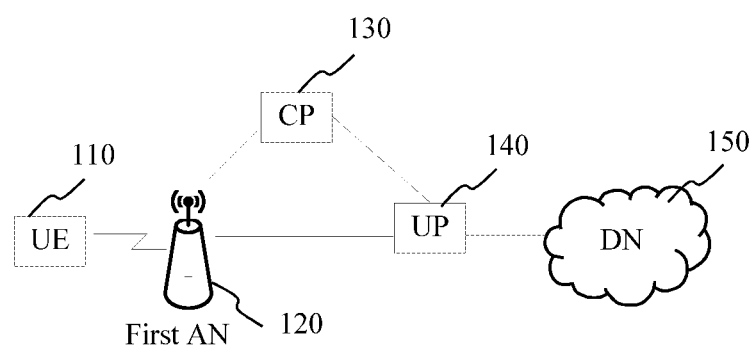
FIG. 1A, FIG. 1B, and FIG. 1C are schematic diagrams of implementation environments in embodiments of the present disclosure.

FIG. 1A is a schematic diagram of an implementation environment of a device control method according to embodiments of the present disclosure. As shown in FIG. 1A, the implementation environment includes UE 110, a first AN 120, a CP network element 130, a user plane (UP) network element 140, and a DN 150.

The UE no is a network terminal device and may be a device such as a mobile phone, a network access terminal device, or an Internet of Things device.

The first AN 120 is configured to provide wireless access for the UE 110. The first AN 120 may be a device such as an eNodeB, a Wireless Fidelity access point (WiFi AP), or a Worldwide Interoperability for Microwave Access base station (WiMAX BS).

The CP 130 is a network element providing mobility management or forwarding path management. For example, the CP 130 may be an MME, a control plane function of an SGW, a control plane function of a PGW, or all or some functions of a mobile gateway controller formed by combining the foregoing network elements.

The UP 140 is a network element providing service packet forwarding for a user. The network element may be a forwarding plane function of an SGW, a forwarding plane function of a PGW, or a forwarding device obtained after virtualizing a physical device such as a router, a switch, or a software defined network (SDN) switch. Alternatively, the UP 140 may be a forwarding plane network element.

The DN 150 may be a PDN such as the Internet, a VPN, an IMS, or a WAP network provided by an operator.

Figure 1B:
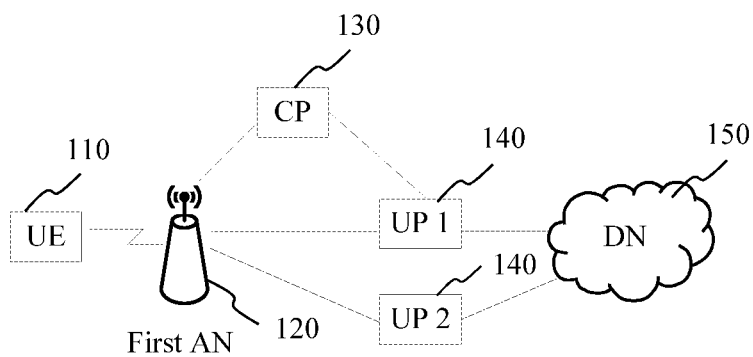

It should be noted that, in FIG. 1A, that the UE accesses one UP (that is, accesses a same anchor) is used as an example for description. Optionally, the UE may access at least two UPs, and access a same PDN using the at least two UPs. For example, FIG. 1B is a schematic diagram of another possible implementation environment according to the present disclosure.

It should be further noted that control and forwarding may be separated for the CP and the UP. In other words, the UP does not have a control function. Alternatively, control and forwarding may not be separated for the CP and the UP. In other words, the UP still has a control function. A specific implementation of the CP and the UP is not limited in the embodiments.

Figure 1C:
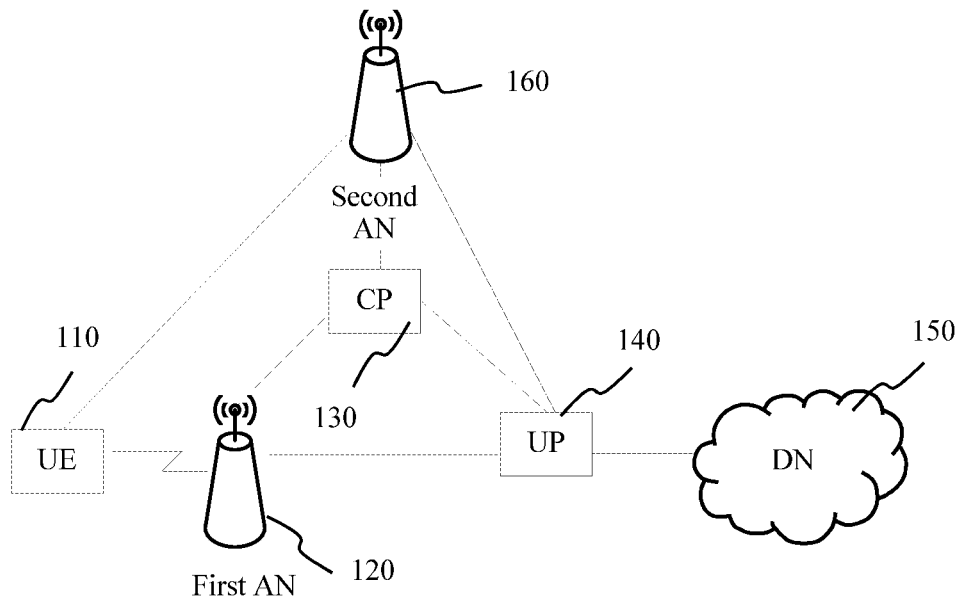

It should be further noted that, optionally, the UE no may need to be handed over from the accessed first AN 120 to another AN. As shown in FIG. 1C, the implementation environment may further include a second AN 160. The second AN 160 is similar to the first AN 120. Details are not described herein again.

Figure 2:
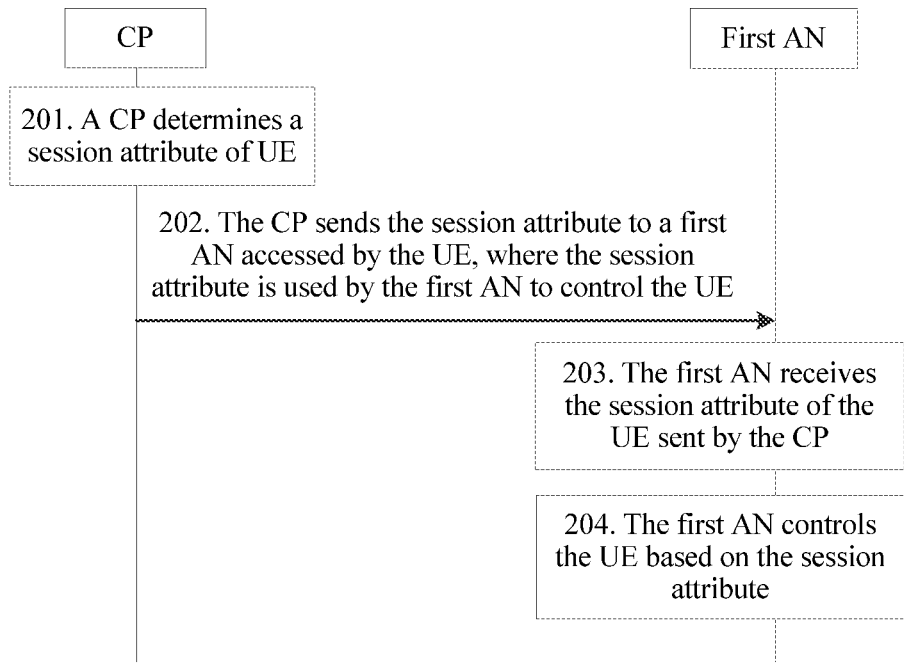
FIG. 2 is a flowchart of a device control method according to an embodiment of the present disclosure.

FIG. 2 is a method flowchart of a device control method according to an embodiment of the present disclosure. As shown in FIG. 2, the device control method may include the following steps.

Step 201: A CP determines a session attribute of UE.

Specifically, if one session exists between the UE and a DN, the CP directly determines a session attribute of the session of the UE. If at least two sessions exist between the UE and the DN, the CP may determine a correspondence between a session attribute of each of the at least two sessions and each bearer in the UE. A session corresponds to at least one bearer, and a bearer in this embodiment is one service flow or an aggregate of at least two service flows. In other words, in this embodiment, a granularity relationship among a bearer, a session, and the UE is: bearer<session<UE.

The session attribute may include at least one of a service area corresponding to a session and a bandwidth constraint condition corresponding to a session. The service area corresponding to the session indicates a release restriction of a bearer during moving of the UE, and includes at least one of s TA, an LA, and a cell list. The service area corresponding to the session is an area in which the session requires session continuity. That is, in the service area corresponding to the session, the session requires session continuity, while outside the service area corresponding to the session, the session does not require session continuity. For example, that the bearer is one service flow is used as an example. A service flow 1 in the UE does not require session continuity. If a DN connection attribute corresponding to the service flow is a cell list, when the UE moves and is removed from the cell list, the first AN releases a radio resource corresponding to the service flow. The bandwidth constraint condition may include a bandwidth rate, a delay, or the like. For example, the bandwidth constraint condition includes that a maximum bandwidth of all bearers meeting a session attribute is 100 kb/s.

Optionally, when the CP determines a correspondence between a bearer and a session attribute, if the bearer is one service flow, the bearer may be indicated using a service flow identifier of the service flow, for example, indicated using an Internet Protocol (IP) 5-tuple of the service flow. If the bearer is an aggregate of at least two service flows, the bearer may be indicated using a bearer identifier, for example, indicated using a bearer ID.

Step 202: The CP sends the session attribute to a first AN accessed by the UE, where the session attribute is used by the first AN to control the UE.

Step 203: The first AN receives the session attribute of the UE sent by the CP.

Step 204: The first AN controls the UE based on the session attribute.

In conclusion, according to the device control method provided in this embodiment, the CP sends the session attribute of the UE to the first AN accessed by the UE, so that the first AN can control the UE based on the session attribute. The first AN may control the UE at a session granularity based on the session attribute. In this way, the foregoing method resolves problems that because only UE-granularity control can be performed on UE, a particular quantity of radio resources are wasted when mobility management is performed on the UE and on-demand mobility management cannot be performed, thereby controlling the UE at a smaller granularity (e.g. a session granularity), improving accuracy and flexibility of controlling the UE, and reducing radio resources required in a control process.

It should be noted that the step of determining, by the CP, a session attribute may include the following four possible obtaining manners.

In a first manner, a control request sent by the UE via the first AN is received, and the session attribute of the UE is determined based on service requirement information carried in the control request, where the control request may be an access request, a connection establishment request, or a service request. The access request is a request sent by the UE in a network registration procedure, for example, the access request may be a request sent by the UE via the first AN when the UE is powered on. The connection establishment request is a request for requesting, by the UE, to establish a network connection, for example, the connection establishment request may be an establishment request for requesting to establish a DN connection to the DN. The service request is a request for establishing a signaling connection for each interface of a radio access network and is used to enable the UE to be switched from an idle state to a connected state.

In a second manner, the pre-configured session attribute of the UE is obtained.

In a third manner, an obtaining request is sent to a subscription server, and the session attribute returned by the subscription server is received.

In a fourth manner, the session attribute sent by a policy decision network element is received; or an index sent by the policy decision network element is received, and the session attribute corresponding to the index is determined.

The following separately describes the foregoing four possible implementations. In addition, in the following embodiment, that a CP obtains a session attribute using the foregoing first obtaining manner and a control request is an access request is mainly used as an example for description.

Figure 3:
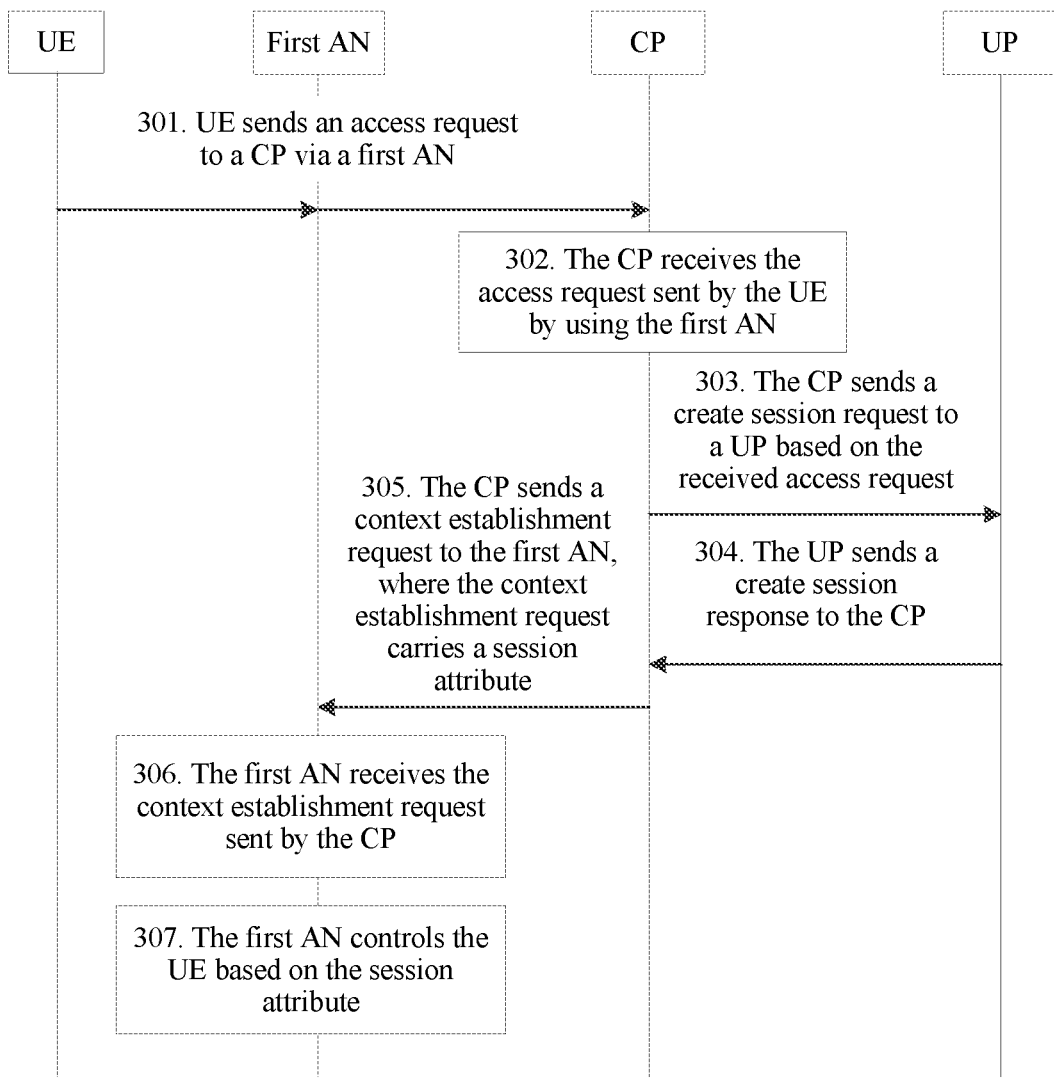
FIG. 3 is a flowchart of a device control method according to another embodiment of the present disclosure.

FIG. 3 is a method flowchart of a device control method according to another embodiment of the present disclosure. In this embodiment, that a CP obtains a session attribute by receiving a control request and the control request is an access request is used as an example for description. In addition, in this embodiment, that control and forwarding are not separated for the CP and a UP is used as an example. As shown in FIG. 3, the device control method may include the following steps.

Step 301: UE sends an access request to the CP via a first AN.

When the UE is powered on or an additional DN connection needs to be established, the UE may send the access request to the CP via the accessed first AN. The access request may carry service requirement information.

Step 302: The CP receives the access request sent by the UE via the first AN.

After receiving the access request, the CP obtains the service requirement information of the UE carried in the access request, and determines a session attribute of the UE based on the service requirement information. Specifically, when one session exists between the UE and a DN, the CP may determine a session attribute of the session based on the service requirement information. If at least two sessions exist between the UE and the DN, the CP may determine session attributes of the at least two sessions based on the service requirement information. Optionally, the CP may determine correspondences between the at least two session attributes and each bearer in the UE. A session corresponds to at least one bearer, and the bearer described in this embodiment may be one service flow or may be an aggregate of at least two service flows. This is not limited in this embodiment.

The foregoing session attribute may include at least one of a service area corresponding to a session and a bandwidth constraint condition corresponding to a session. The service area corresponding to the session indicates a release restriction of a bearer during moving of the UE, and includes at least one of TAs, LAs, and a cell list. The bandwidth constraint condition may include a bandwidth rate, a delay, or the like.

Optionally, when the CP determines a correspondence between a bearer and a session attribute based on the service requirement information, if the bearer is one service flow, the bearer may be indicated using a service flow identifier of the service flow, for example, indicated using an IP 5-tuple of the service flow; and if the bearer is an aggregate of at least two service flows, the bearer may be indicated using a bearer identifier, for example, indicated using a bearer ID.

Step 303: The CP sends a create session request to the UP based on the received access request.

Step 304: The UP sends a create session response to the CP.

Optionally, the create session response carries a UP IP address and identifier information used to indicate a tunnel endpoint of the UP. The identifier information may be a tunnel endpoint identifier (TEID).

Step 305: The CP sends a context establishment request to the first AN, where the context establishment request carries a session attribute.

When only one session exists between the UE and the DN, the context establishment request may include only a session attribute of the session. When at least two sessions exist between the UE and the DN, the context establishment request may include a correspondence between each bearer and a session attribute.

Optionally, the context establishment request may include other content. For example, the context establishment request may include a UP IP, a UP TEID, and a control accept message. The control accept message includes an IP address of the UE. Only content related to this embodiment is described in this embodiment, and actually included content is not limited.

Step 306: The first AN receives the context establishment request sent by the CP.

Step 307: The first AN controls the UE based on the session attribute.

After the first AN receives the context establishment request, the first AN may obtain the session attribute carried in the context establishment request. Then, the first AN may control the UE based on the session attribute. Optionally, if the context establishment request carries the correspondence between a bearer and a session attribute, the first AN may obtain the correspondence from the context establishment request, and control the UE based on the correspondence.

The controlling, by the first AN, the UE based on the session attribute may include: performing mobility management control on the UE based on the session attribute, or performing quality of service (QoS) control on the UE based on the session attribute, or simultaneously performing mobility management control and QoS control on the UE.

Optionally, the performing, by the first AN, mobility management control on the UE based on the session attribute may include the following steps.

First, the first AN sends a measurement control message to the UE.

The measurement control message includes a UE measurement control parameter. For example, the measurement control message may include signal strength, a cell list that needs to be measured, and a reply manner of replying with a measurement report.

Second, the first AN receives a measurement report returned by the UE.

Third, when determining, based on the measurement report, that the UE needs to be handed over to a second AN, the first AN controls the UE based on the session attribute.

The session attribute may include one or more of the service area corresponding to a session and the bandwidth constraint condition corresponding to a session. Therefore, based on different session attribute content, this step may include the following two cases.

A first case is as follows: When the session attribute includes the service area corresponding to the session, one session or at least two sessions may exist between the UE and the DN. Therefore, the following separately describes different cases.

Figure 4:
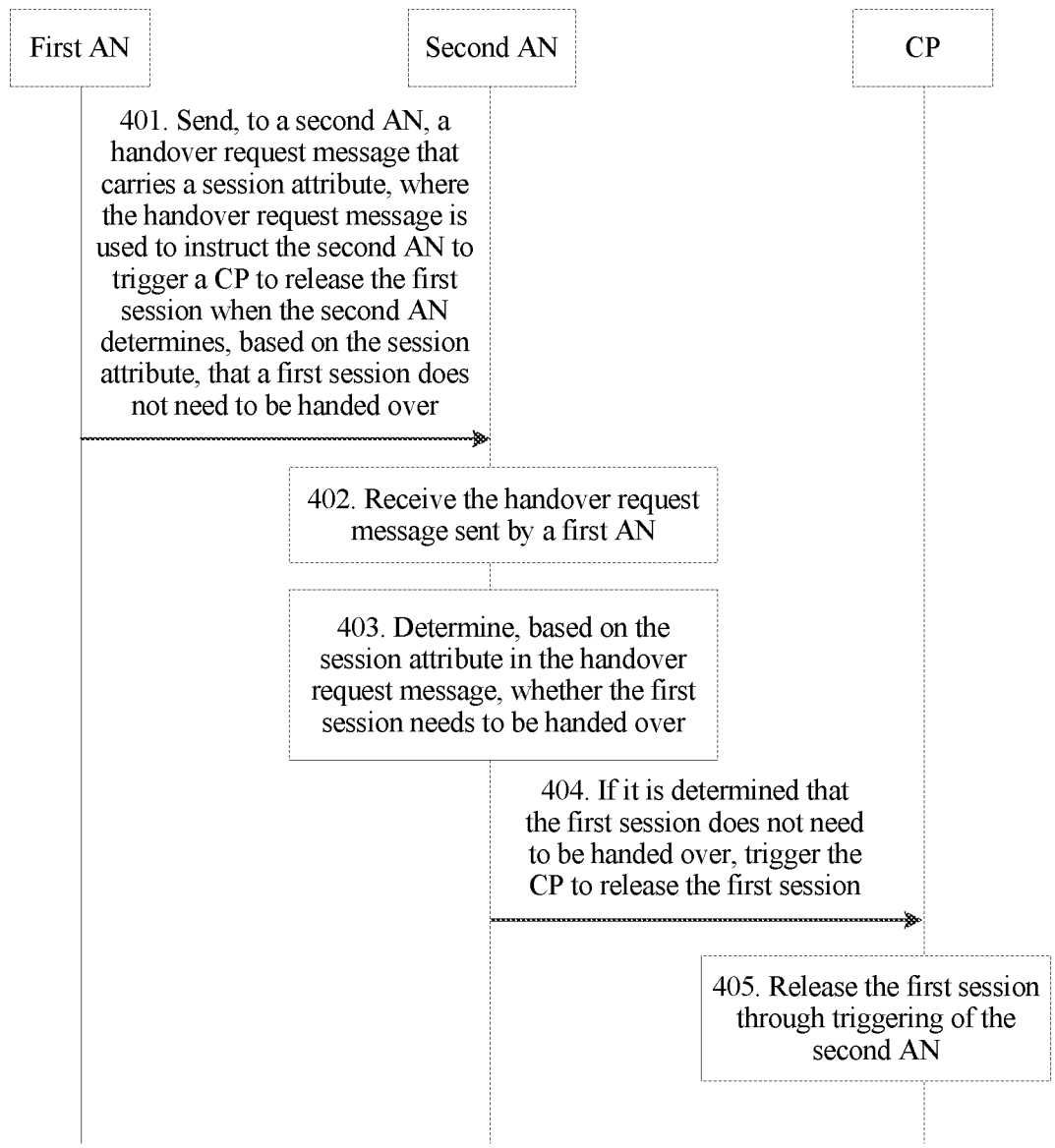
FIG. 4 is a flowchart of a method for controlling UE according to another embodiment of the present disclosure.
Figure 6:
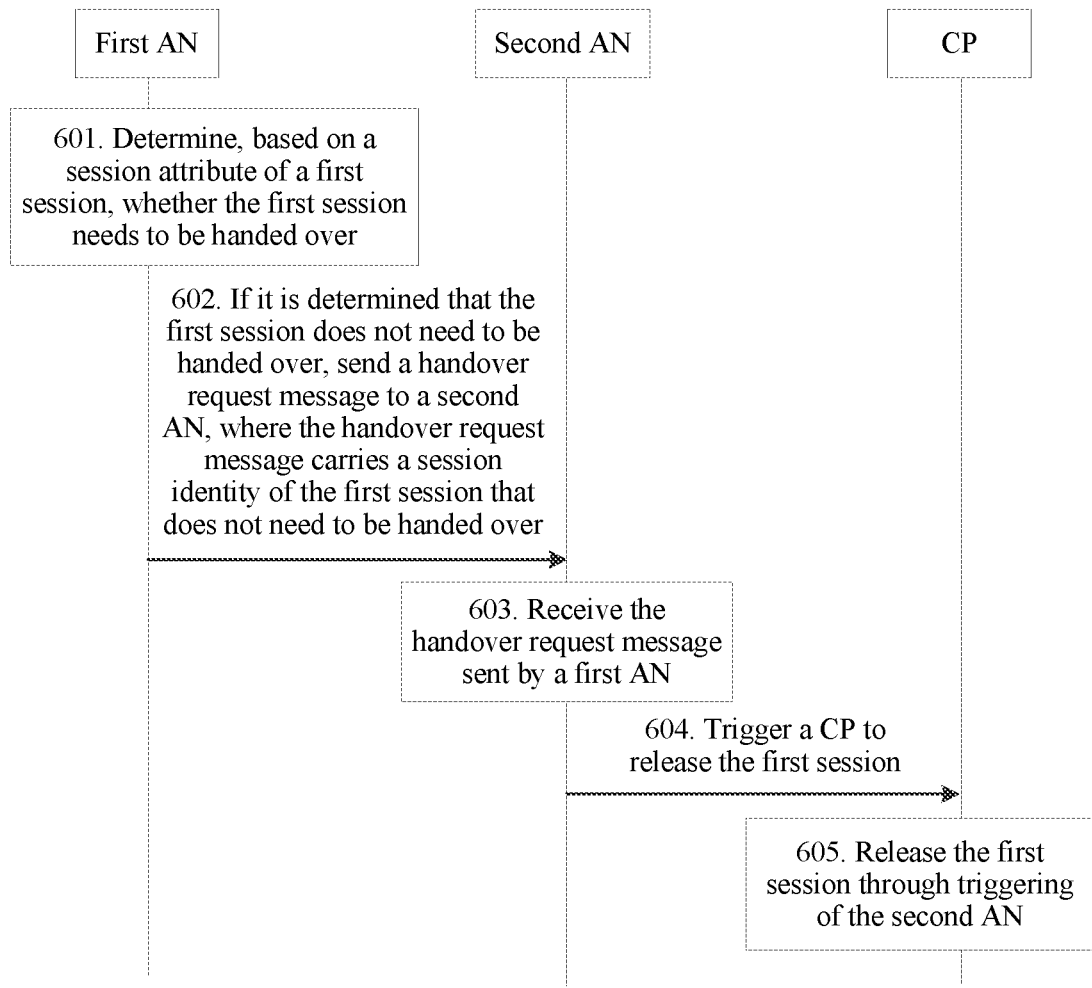
FIG. 6 is a flowchart of still another method for controlling UE according to another embodiment of the present disclosure.

If a first session exists between the UE and the DN (only the first session is included), and the session attribute includes a service area corresponding to the first session, this step may include two possible implementations in FIG. 4 and FIG. 6.

An example in FIG. 4 includes the following.

Step 401: The first AN sends, to a second AN, a handover request message that carries the session attribute, where the handover request message is used to instruct the second AN to trigger the CP to release the first session when the second AN determines, based on the session attribute, that the first session does not need to be handed over.

Optionally, the handover request message may further include context information of a session in the UE, that is, include context information of the first session. The context information of the first session includes a session identity of the first session, a QoS parameter corresponding to a radio bearer of the first session, and the like. This is not limited herein.

Step 402: The second AN receives the handover request message sent by the first AN.

Step 403: The second AN determines, based on the session attribute in the handover request message, whether the first session needs to be handed over.

Optionally, the step of determining, by the second AN, whether the first session needs to be handed over includes: detecting, based on a session attribute of the first session, whether the second AN is in the service area of the first session. If the second AN is in the service area of the first session, it indicates that the first session meets a session continuity requirement, and the second AN determines that the first session needs to be handed over. If the second AN is not in the service area of the first session, it indicates that the first session does not meet a session continuity requirement, and the second AN determines that the first session does not need to be handed over.

Step 404: If the second AN determines that the first session does not need to be handed over, the second AN triggers the CP to release the first session.

If the second AN determines that the first session does not need to be handed over, the second AN may trigger the CP to release the first session. Optionally, the second AN may send a path switch request message to the CP. The path switch request message carries the session identity of the first session that does not need to be handed over.

Optionally, when the second AN determines that the first session does not need to be handed over, the second AN may not establish a radio resource corresponding to the first session. Details are not described herein.

If the second AN determines that the first session needs to be handed over, the second AN establishes a radio resource corresponding to the first session, and triggers the CP to modify a path of the first session. Details are not described herein.

Step 405: The CP releases the first session after being triggered by the second AN.

Optionally, the CP may receive the path switch request message sent by the second AN, and after obtaining, through parsing, the session identity that is carried in the path switch request message and that is of the first session that does not need to be handed over, the CP initiates a release procedure and further releases the first session. The releasing, by the CP, the first session described in this embodiment is that the CP releases a resource of the first session in the first AN and a resource of the first session in the UP. Details are not described in this embodiment.

Figure 5A:
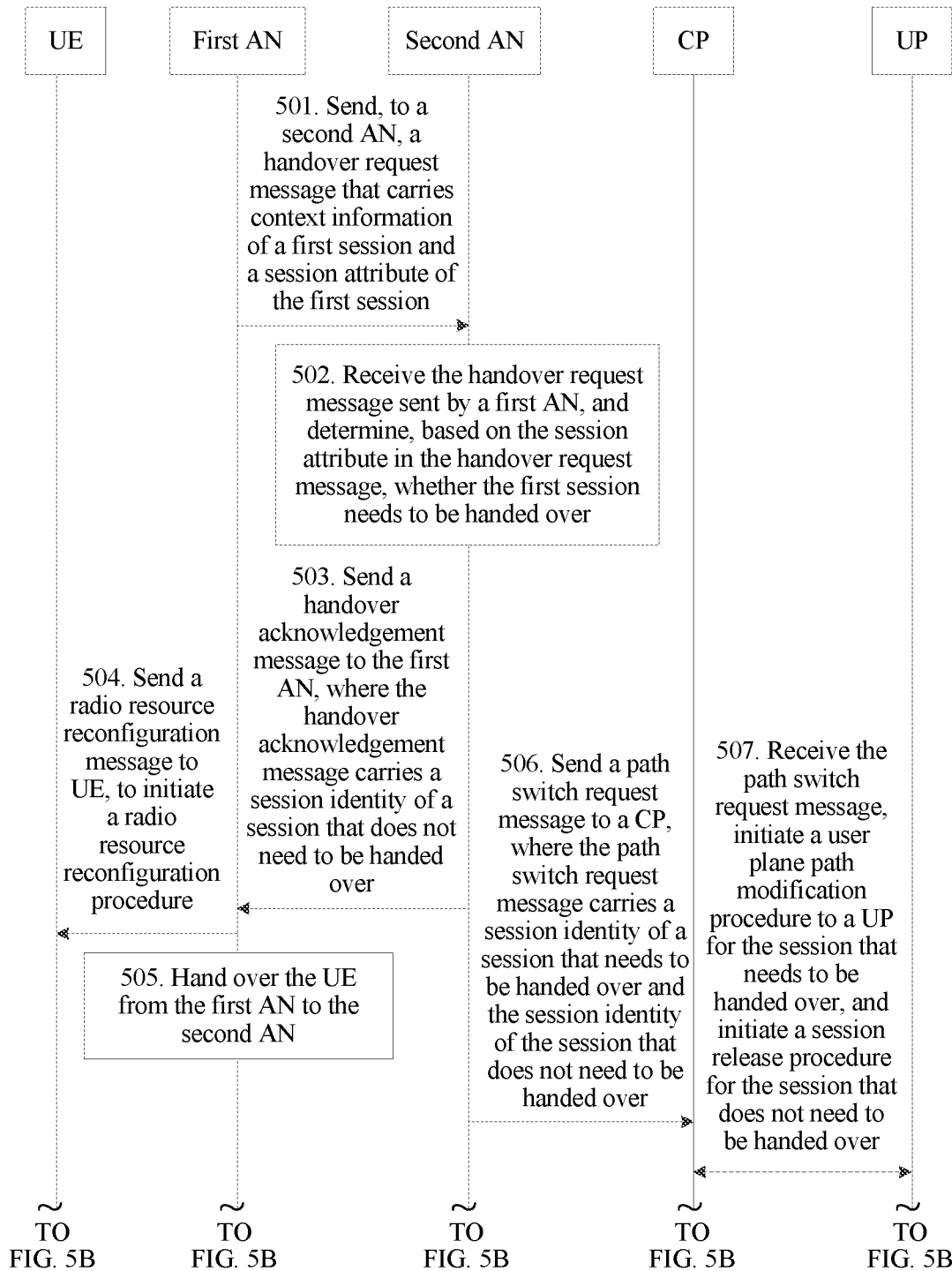
FIG. 5A and FIG. 5B are a flowchart of another method for controlling UE according to another embodiment of the present disclosure.
Figure 5B:
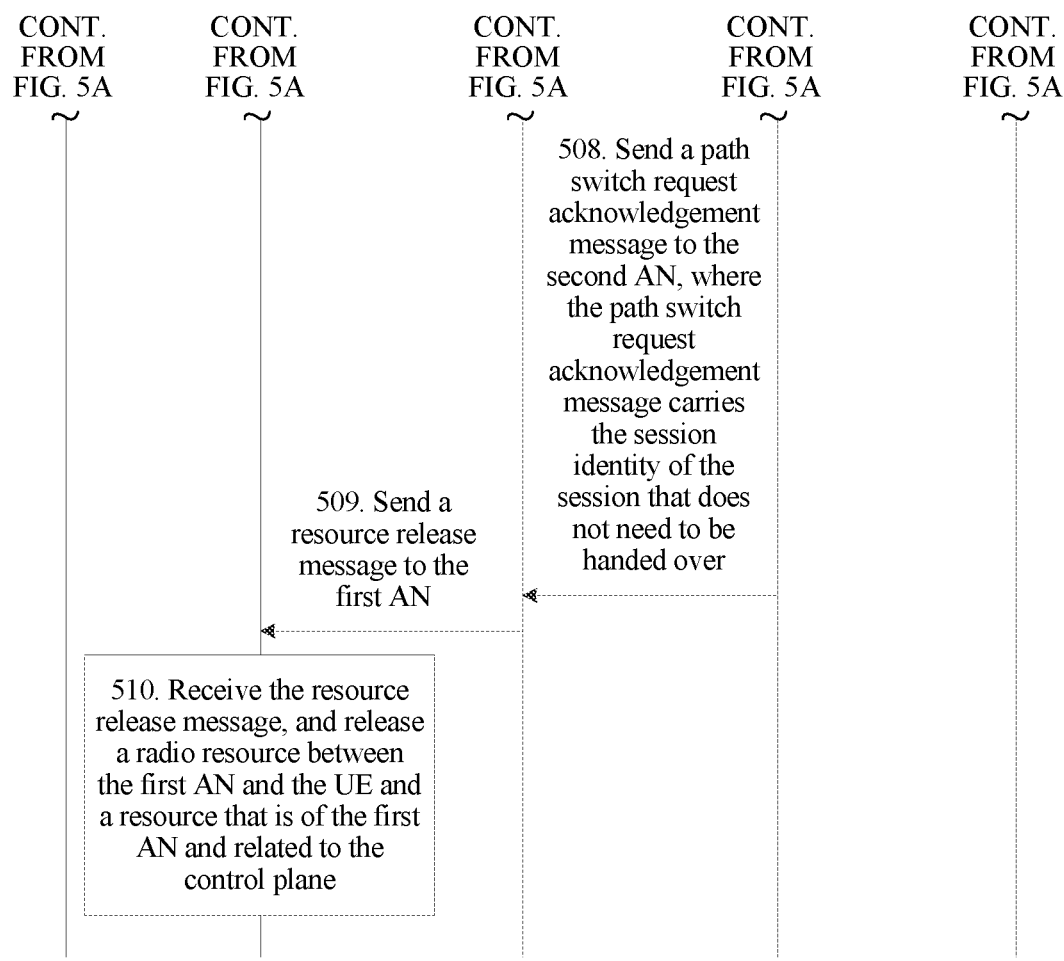

Optionally, the controlling the UE may further include other steps. For example, referring to FIG. 5A and FIG. 5B, a process of controlling the UE includes the following steps.

501. The first AN sends, to a second AN, a handover request message that carries context information of the first session and a session attribute of the first session.

502. The second AN receives the handover request message sent by the first AN, and determines, based on the session attribute in the handover request message, whether the first session needs to be handed over.

503. The second AN sends a handover acknowledgement message to the first AN, where the handover acknowledgement message carries a session identity of a session that does not need to be handed over.

504. The first AN sends a radio resource reconfiguration message to the UE, to initiate a radio resource reconfiguration procedure.

505. Hand over the UE from the first AN to the second AN.

506. The second AN sends a path switch request message to the CP, where the path switch request message carries a session identity of a session that needs to be handed over and the session identity of the session that does not need to be handed over.

507. The CP receives the path switch request message, the CP initiates a user plane path modification procedure to the UP for the session that needs to be handed over, and the CP initiates a session release procedure for the session that does not need to be handed over.

508. The CP sends a path switch request acknowledgement message to the second AN, where the path switch request acknowledgement message carries the session identity of the session that does not need to be handed over.

509. The second AN sends a resource release message to the first AN.

510. The first AN receives the resource release message, and releases a radio resource between the first AN and the UE and a resource that is of the first AN and related to the control plane.

An example in FIG. 6 includes the following.

Step 601: The first AN determines, based on a session attribute of the first session, whether the first session needs to be handed over.

This step is similar to step 403. Details are not described herein again.

Step 602: If the first AN determines that the first session does not need to be handed over, the first AN sends a handover request message to a second AN, where the handover request message carries a session identity of the first session that does not need to be handed over.

The handover request message is used to instruct the second AN to trigger releasing of the first session.

Optionally, the handover request message may further carry context information of the first session, for example, carry a QoS parameter corresponding to a radio bearer of the first session. This is not limited herein.

If the first AN determines that the first session needs to be handed over, the first AN may send, to the second AN, the handover request message that carries the context information of the first session that needs to be handed over, and the second AN establishes a radio resource corresponding to the first session, and triggers the CP to modify a path of the first session. Details are not described herein.

Step 603: The second AN receives the handover request message sent by the first AN.

After receiving the handover request message, the second AN may not establish a radio resource corresponding to the first session.

Step 604: The second AN triggers the CP to release the first session.

After the second AN receives the handover request message, the second AN may trigger, based on the session identity, carried in the handover request message, of the first session that does not need to be handed over, the CP to release the first session. Optionally, the second AN may not establish the radio resource corresponding to the first session that does not need to be handed over.

Step 605: The CP releases the first session after being triggered by the second AN.

Optionally, the CP may release a resource of the first session in the first AN and a resource of the first session in the UP. Details are not described herein.

Figure 7A:
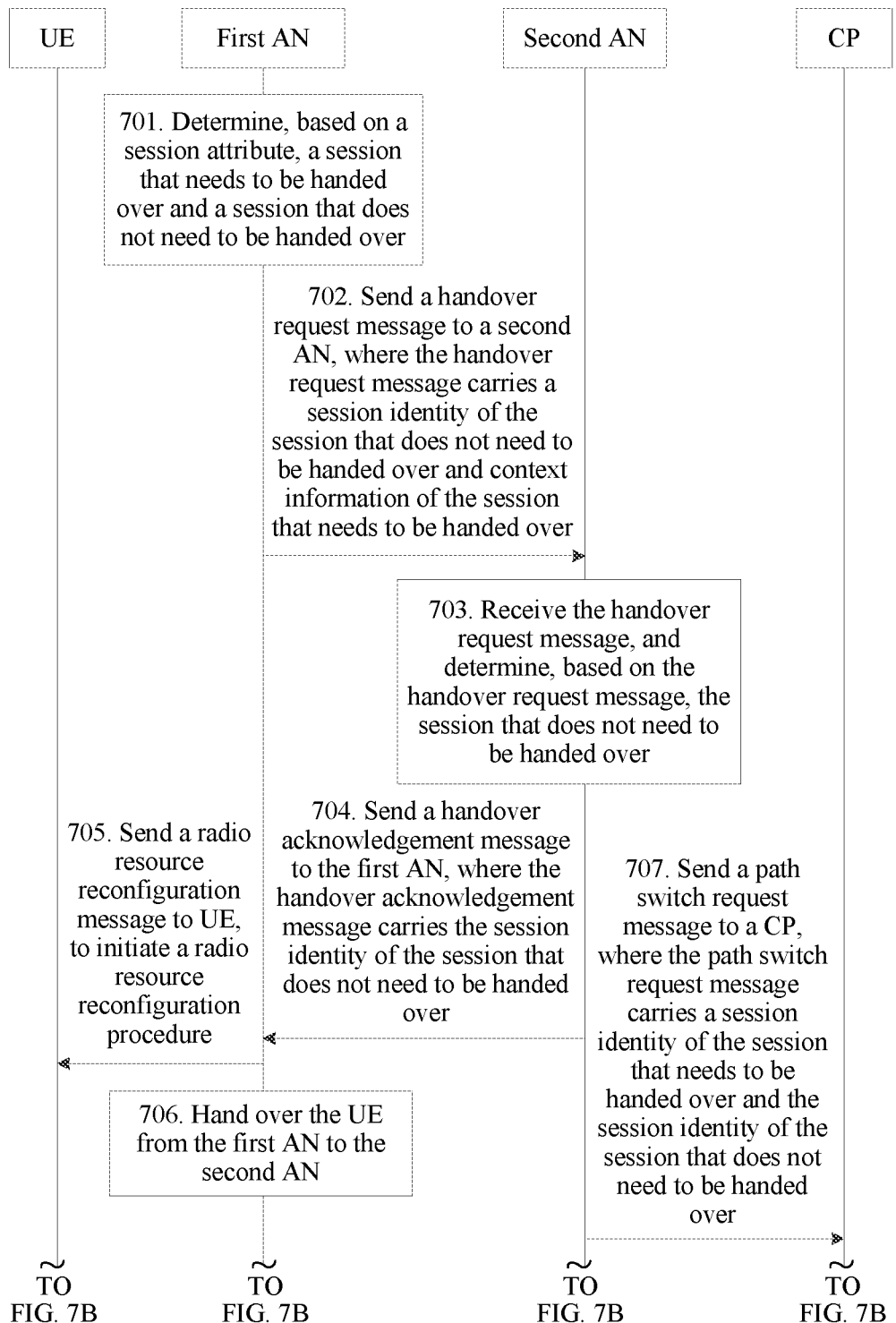
FIG. 7A and FIG. 7B are a flowchart of still another method for controlling UE according to another embodiment of the present disclosure.
Figure 7B:
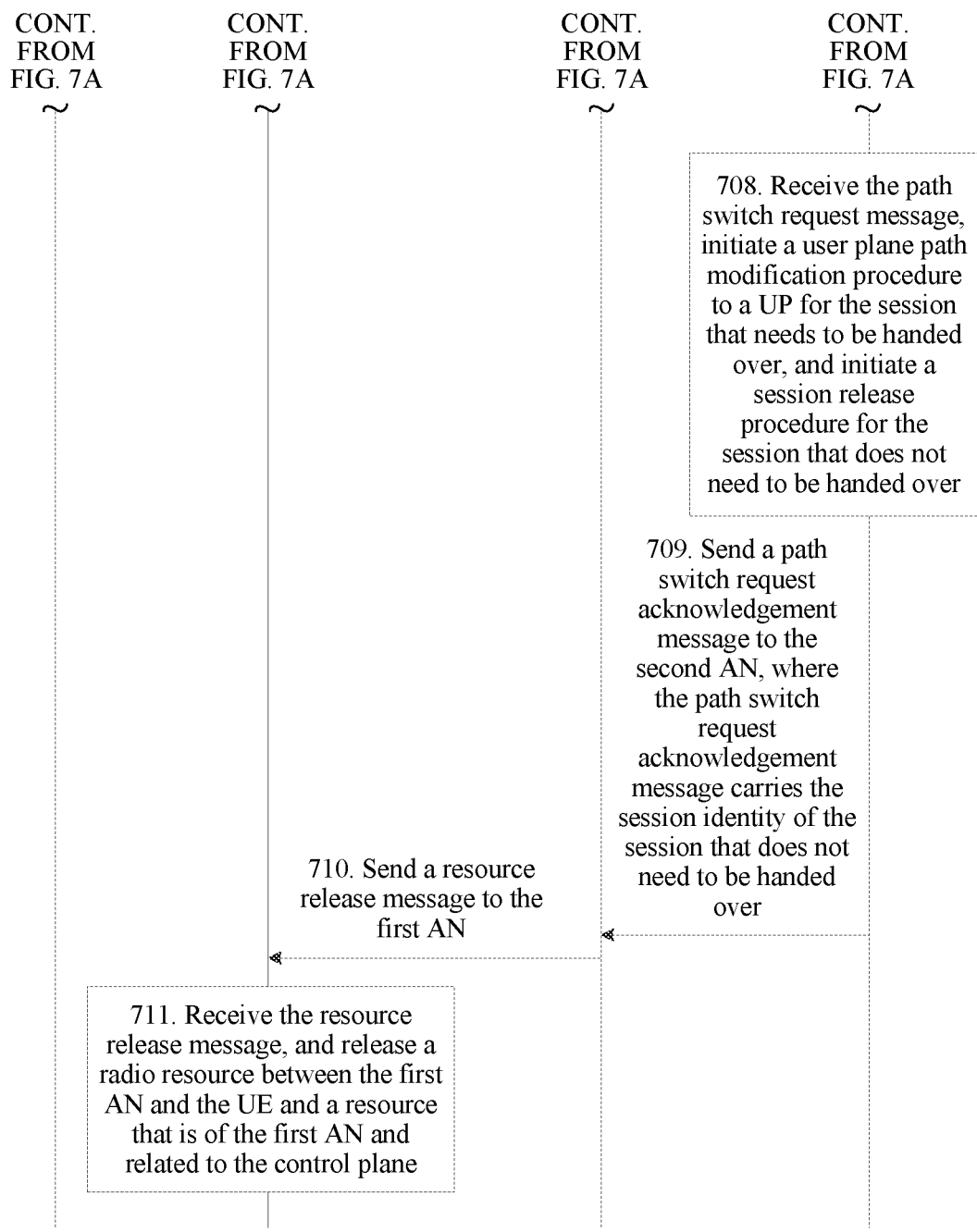

Optionally, other steps may be further included. For example, referring to FIG. 7A and FIG. 7B, the controlling the UE may include the following steps.

701. The first AN determines, based on the session attribute, a session that needs to be handed over and a session that does not need to be handed over.

702. The first AN sends a handover request message to a second AN, where the handover request message carries a session identity of the session that does not need to be handed over and context information of the session that needs to be handed over.

703. The second AN receives the handover request message, and determines, based on the handover request message, the session that does not need to be handed over.

704. The second AN sends a handover acknowledgement message to the first AN, where the handover acknowledgement message carries the session identity of the session that does not need to be handed over.

705. The first AN sends a radio resource reconfiguration message to the UE, to initiate a radio resource reconfiguration procedure.

706. Hand over the UE from the first AN to the second AN.

707. The second AN sends a path switch request message to the CP, where the path switch request message carries a session identity of the session that needs to be handed over and the session identity of the session that does not need to be handed over.

708. The CP receives the path switch request message, the CP initiates a user plane path modification procedure to the UP for the session that needs to be handed over, and the CP initiates a session release procedure for the session that does not need to be handed over.

709. The CP sends a path switch request acknowledgement message to the second AN, where the path switch request acknowledgement message carries the session identity of the session that does not need to be handed over.

710. The second AN sends a resource release message to the first AN.

711. The first AN receives the resource release message, and releases a radio resource between the first AN and the UE and a resource that is of the first AN and related to the control plane.

Figure 8:
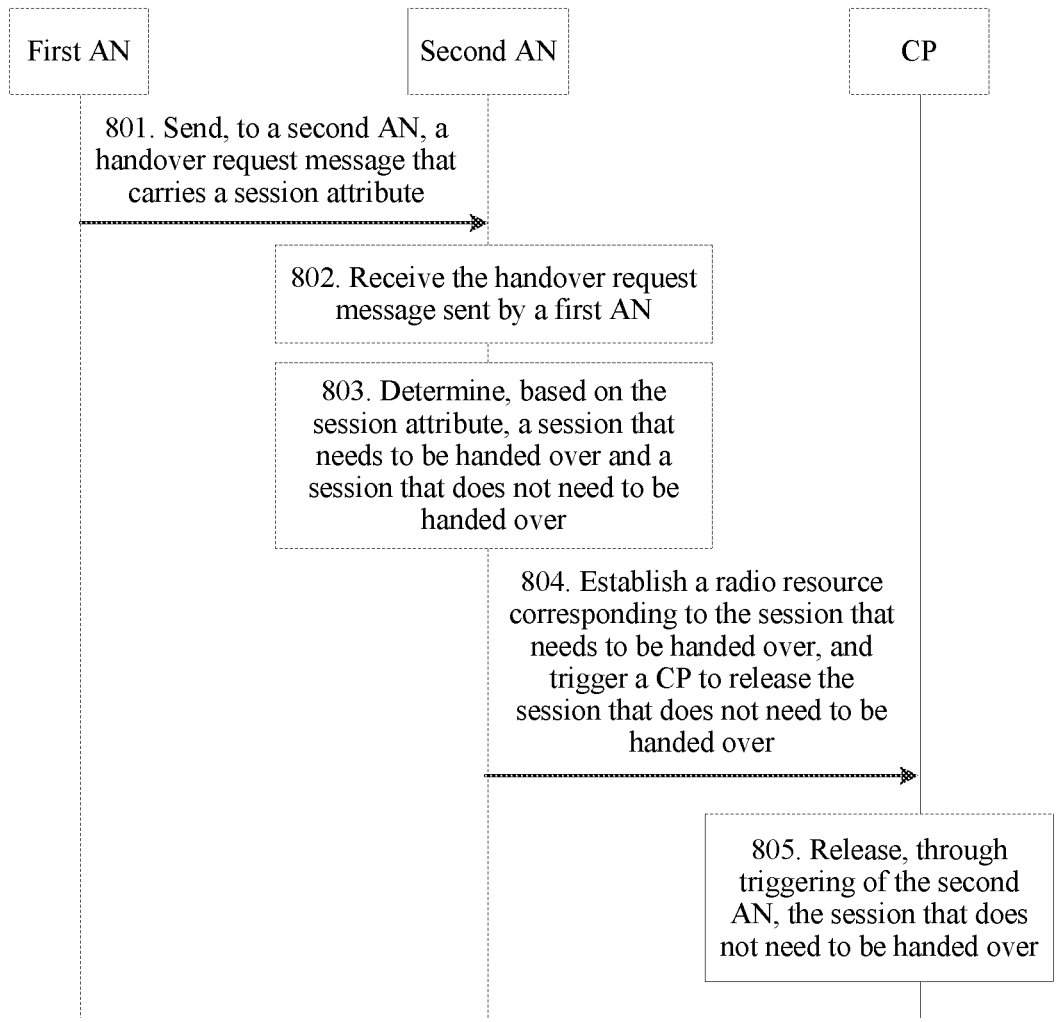
FIG. 8 is a flowchart of still another method for controlling UE according to another embodiment of the present disclosure.
Figure 10:
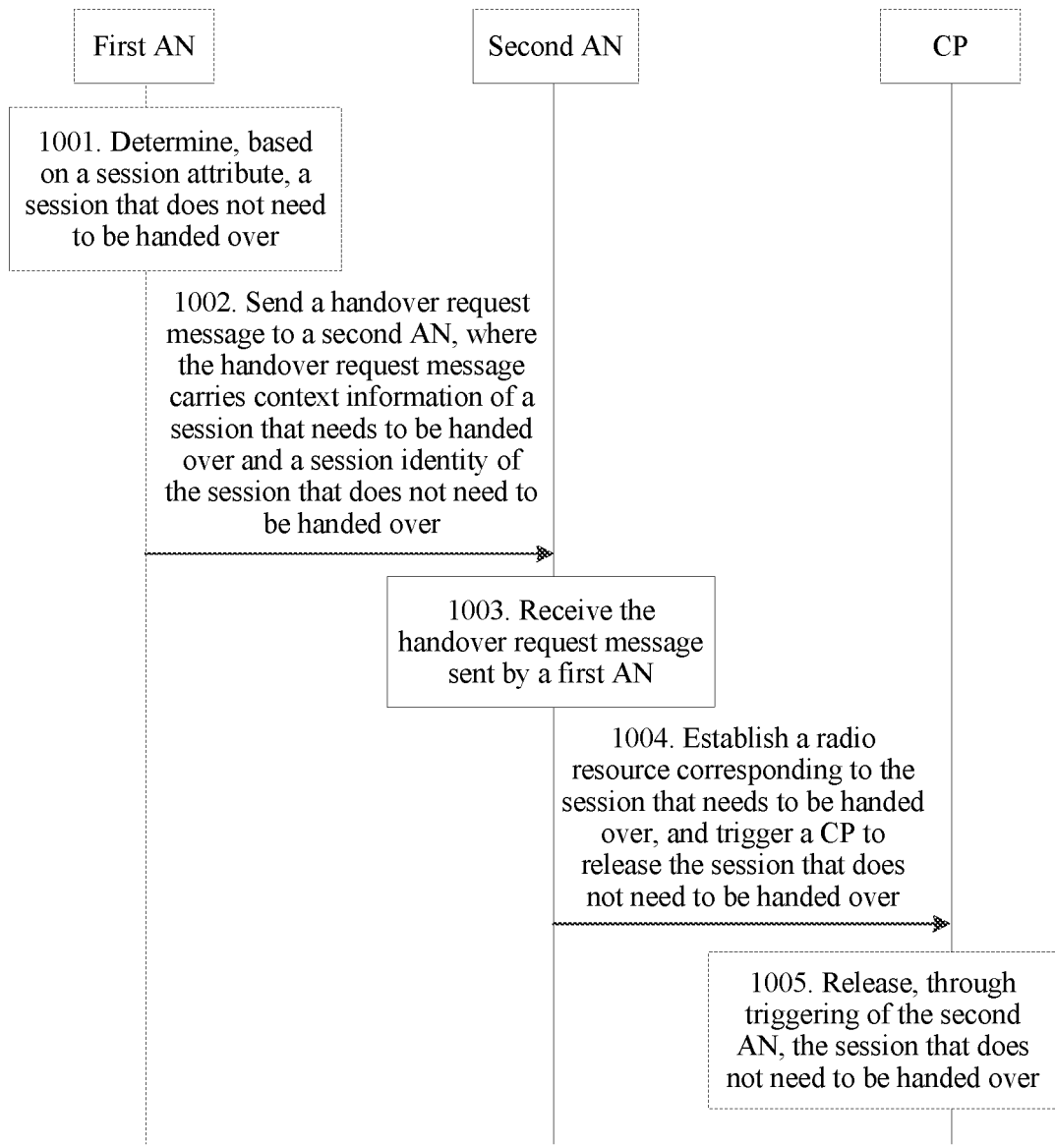
FIG. 10 is a flowchart of still another method for controlling UE according to another embodiment of the present disclosure.

When at least two sessions exist between the UE and the DN, and the session attribute includes a service area corresponding to each of the at least two sessions, the step of controlling the UE may include two possible implementations in FIG. 8 and FIG. 10.

In an example in FIG. 8, this step may include the following steps.

Step 801: The first AN sends, to a second AN, a handover request message that carries the session attribute.

For example, if three sessions that are a session 1, a session 2, and a session 3 exist between the UE and the DN, the first AN may send a handover request message to the second AN, and the handover request message carries session attributes of the three sessions.

Step 802: The second AN receives the handover request message sent by the first AN.

Step 803: The second AN determines, based on the session attribute, a session that needs to be handed over and a session that does not need to be handed over.

The second AN may detect, based on a session attribute of each session, whether the second AN is located in a service area corresponding to the session. If the second AN is in the service area corresponding to the session, the second AN determines that the session needs to be handed over; and if the second AN is not in the service area corresponding to the session, the session does not need to be handed over.

That the three sessions exist between the UE and the DN is still used as an example. The second AN may determine that the session 1 and the session 2 need to be handed over and that the session 3 does not need to be handed over.

Optionally, a session may correspond to at least one bearer, and when a session needs to be handed over, some bearers in a plurality of bearers corresponding to the session may need to be handed over, while some bearers may not need to be handed over. Therefore, in this embodiment, optionally, the second AN may further determine, based on a correspondence between a session attribute and each bearer, a bearer that needs to be handed over (that is, a bearer that requires session continuity) and a bearer that does not need to be handed over (that is, a bearer that does not require session continuity).

Step 804: The second AN establishes a radio resource corresponding to the session that needs to be handed over, and triggers the CP to release the session that does not need to be handed over.

For the determined session that needs to be handed over, the second AN establishes the radio resource corresponding to the session that needs to be handed over. For example, the second AN may establish radio resources corresponding to the session 1 and the session 2. For the determined session that does not need to be handed over, the second AN does not establish a radio resource corresponding to the session that does not need to be handed over, and the second AN may trigger the CP to release the session that does not need to be handed over.

Optionally, the second AN may establish a radio resource corresponding to the bearer that needs to be handed over, and trigger the CP to release the bearer that does not need to be handed over.

Step 805: The CP releases, after being triggered by the second AN, the session that does not need to be handed over.

Figure 9:
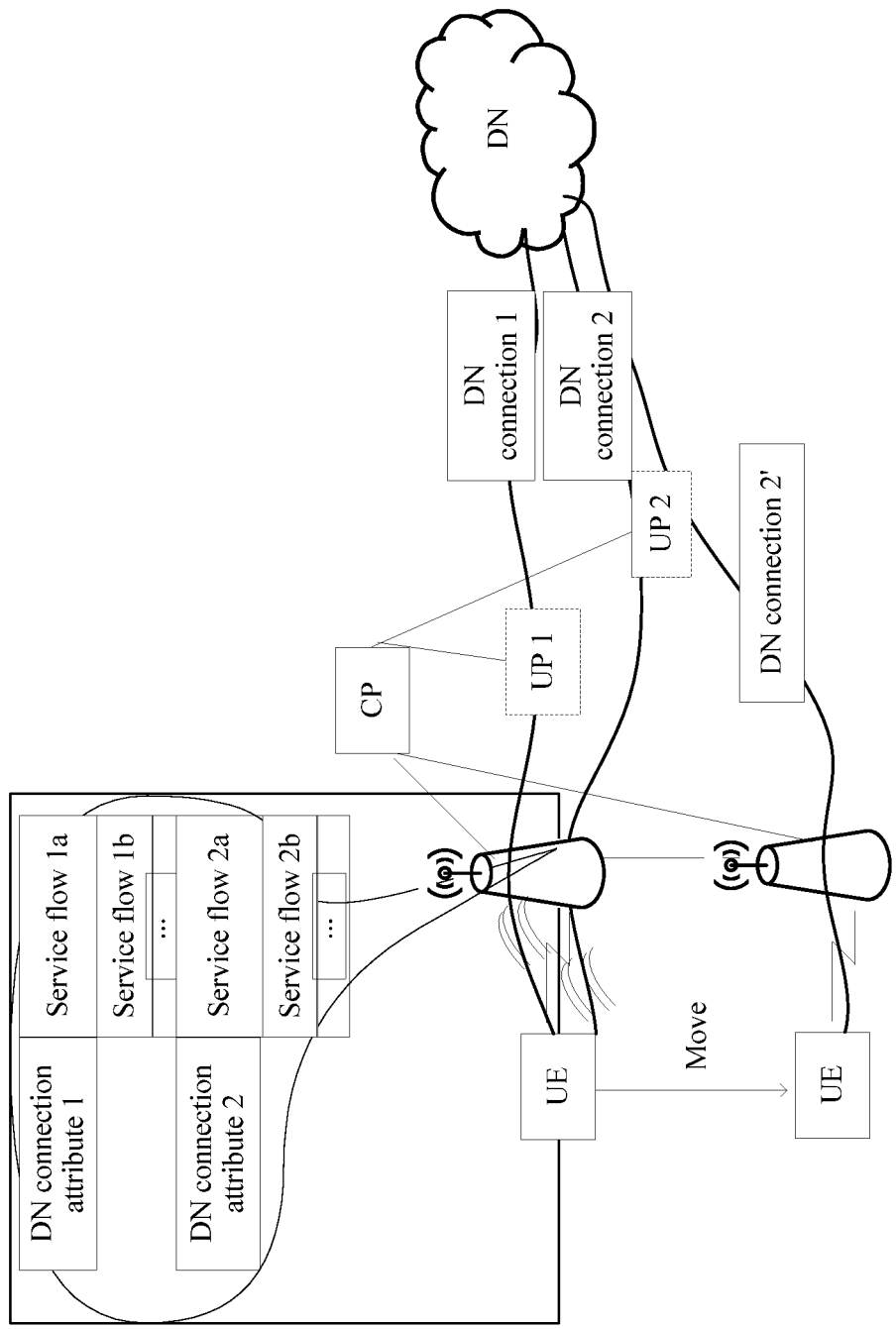
FIG. 9 is a schematic diagram of an implementation scenario according to another embodiment of the present disclosure.

For example, referring to FIG. 9, before being handed over from a first AN to a second AN, UE includes a DN connection 1 to a UP 1 and a DN connection 2 to a UP 2. When the first AN determines that the UE needs to be handed over to the second AN, the first AN may send, to the second AN, a handover request message that carries session attributes of the DN connection 1 and the DN connection 2. (For example, that a bearer includes one service flow is used as an example. With reference to FIG. 9, service flows corresponding to the DN connection 1 include a service flow 1a, a service flow 1b, and the like; and service flows corresponding to the DN connection 2 include a service flow 2a, a service flow 2b, and the like. The handover request message may include a list that includes the service flow 1a, the service flow 1b, the service flow 2a, the service flow 2b, and the like, as shown in Table 1.) If the second AN determines that the DN connection 1 does not need to be handed over and that the DN connection 2 needs to be handed over, the second AN establishes a radio resource corresponding to the DN connection 2, does not establish a radio resource corresponding to the DN connection 1, and triggers the CP to release a radio resource corresponding to the DN connection 1.

TABLE 1

| Session attribute | Service flow |
|---|---|
| Session attribute corresponding to the DN connection 1 | Service flow 1a<br>Service flow 1b<br>. . . |
| Session attribute corresponding to the DN connection 2 | Service flow 2a<br>Service flow 2b<br>. . . |

In this embodiment, that two DN connections are connections of different UPs to a DN is merely used as an example. Optionally, the two DN connections may be connections to a same UP, and a connection manner is not limited in this embodiment. In addition, optionally, the UE may further access the DN using more DN connections, and this is not limited in this embodiment, either.

Optionally, before step 804, the second AN may further perform admission control on the session that needs to be handed over. In other words, the second AN detects whether the second AN allows handover of the session that needs to be handed over. If the second AN does not allow access of a session that needs to be handed over, the second AN still does not establish a radio resource corresponding to the session, but triggers the CP to release the session. This is not limited in this embodiment.

Optionally, the controlling the UE may further include other steps. For example, a detailed process may be shown in FIG. 5A and FIG. 5B. Details are not described herein again.

In an example in FIG. 10, this step may include the following steps.

Step 1001: The first AN determines, based on the session attribute, a session that does not need to be handed over.

A determining method for determining, by the first AN based on the session attribute, whether a session needs to be handed over is described in step 403. Details are not described herein again.

Step 1002: The first AN sends a handover request message to a second AN, where the handover request message carries context information of a session that needs to be handed over and a session identity of the session that does not need to be handed over.

Optionally, this step may include the following two possible implementations.

In a first manner, after determining the session that does not need to be handed over, the first AN generates a list of sessions that do not need to be handed over and a list of sessions that need to be handed over, and sends, to the second AN, a handover request message that carries the list of sessions that do not need to be handed over and the list of sessions that need to be handed over. The list of sessions that do not need to be handed over includes a session identity of a session that does not need to be handed over, and the session identity of the session that does not need to be handed over is used to instruct the second AN not to establish a radio resource corresponding to the session. The list of sessions that need to be handed over includes context information of a session that needs to be handed over. The context information includes an identity of the session that needs to be handed over, a QoS parameter corresponding to a radio bearer of the session that needs to be handed over, and the like, and the context information is used to instruct the second AN to establish a radio resource corresponding to the session.

In a second manner, after determining the session that does not need to be handed over, the first AN sends, to the second AN, a handover request message that carries context information of the sessions in the UE and second indication information. The second indication information is used to indicate a session that does not need to be handed over. For example, sessions exist between the UE and the DN include a session 1, a session 2, and a session 3. When the first AN determines, based on session attributes of the sessions, that the session 2 is a session that does not need to be handed over, the first AN may send, to the second AN, a handover request message that carries context information of the session 1, context information of the session 2, context information of the session 3, and second indication information used to indicate that the session 2 does not need to be handed over. Optionally, the second indication information may be a flag bit, and the flag bit may be associated with context information of a corresponding session. For example, that "o" is used to indicate a session that does not need to be handed over is used as an example. In the foregoing example, the first AN may send, to the second AN, a handover request message that carries the context information of the session 1, the context information of the session 2, the context information of the session 3, and "o" associated with the context information of the session 2.

Optionally, the first AN may further send the handover request message to the second AN in another manner. This is not limited in this embodiment.

Step 1003: The second AN receives the handover request message sent by the first AN.

Step 1004: The second AN establishes a radio resource corresponding to the session that needs to be handed over, and triggers the CP to release the session that does not need to be handed over.

The second AN may parse the handover request message, establish, based on the context information obtained through parsing that is of the session that needs to be handed over, the radio resource corresponding to the session that needs to be handed over, and trigger, based on the session identity obtained through parsing that is of the session that does not need to be handed over, the CP to release the session that does not need to be handed over.

Optionally, based on different content carried in the handover request message, this step includes the following two possible implementations.

In a first manner, if the handover request message includes the list of sessions that do not need to be handed over and the list of sessions that need to be handed over, the second AN triggers, based on the list of sessions that do not need to be handed over, the CP to release the session that does not need to be handed over, establishes, based on the list of sessions that need to be handed over, the radio resource corresponding to the session that needs to be handed over, and triggers the CP to modify a path of the session that needs to be handed over. The step of triggering, by the second AN, the CP to release the session that does not need to be handed over is similar to step 404 of triggering, by the second AN, the CP to release the first session in the foregoing embodiment. Details are not described again in this embodiment.

In a second manner, if the handover request message includes context information of the sessions and the second indication information, and the second indication information is used to indicate the session that does not need to be handed over, the second AN triggers, based on the second indication information, the CP to release the session that does not need to be handed over, determines, from the context information of the sessions based on the second indication information, the context information of the session that needs to be handed over, and further establishes, based on the determined context information of the session that needs to be handed over, the radio resource corresponding to the session that needs to be handed over. The context information of the session includes a session identity of the session and QoS information corresponding to a radio bearer of the session. Therefore, the step of determining, by the second AN from the context information of the sessions based on the second indication information, the context information of the session that needs to be handed over may include: selecting, from the context information of the sessions, context information of a session that is not indicated by the second indication information. The selected context information is the context information of the session that needs to be handed over.

Optionally, before step 1004, the second AN may further perform admission control on the session that needs to be handed over. In other words, the second AN detects whether the second AN allows handover of the session that needs to be handed over. If the second AN does not allow access of a session that needs to be handed over, the second AN still does not establish a radio resource corresponding to the session, but triggers the CP to release the session. This is not limited in this embodiment.

Step 1005: The CP releases, after being triggered by the second AN, the session that does not need to be handed over.

This step is similar to step 405 in the foregoing embodiment. Details are not described herein again.

Optionally, the controlling the UE may further include other steps. For example, a detailed process may be shown in FIG. 7A and FIG. 7B. Details are not described herein again.

The foregoing merely uses an example that the first AN releases a session or a bearer using the second AN. Optionally, this step may be further implemented as follows. The first AN may further determine, based on the session attribute, a session that does not need to be handed over, and then send indication information to the CP, and the CP releases the session or a bearer that does not need to be handed over. When only one session exists between the UE and the DN, if the only first session does not need to be handed over, the first AN sends indication information to the CP, and the CP releases the first session. When at least two sessions exist between the UE and the DN, the first AN may determine, based on a correspondence between a session attribute and a bearer, a bearer that does not need to be handed over, and send indication information to the CP, and the CP releases the bearer that does not need to be handed over. In an example, a resource of the bearer is released. After receiving the indication information, the CP sends a delete bearer request to the first AN. After receiving the delete bearer request, the first AN initiates a radio resource reconfiguration procedure, and returns a delete bearer response to the CP. In the radio resource reconfiguration procedure of the first AN, the first AN may delete a radio resource corresponding to the bearer. The indication information includes context information of a bearer on which session continuity management needs to be performed, or includes context information of a bearer on which session continuity management does not need to be performed. This is not limited in this embodiment. In addition, that the CP releases the bearer is merely used as an example herein. A release procedure of triggering the CP to release the session is similar to the foregoing procedure. Details are not described again in this embodiment.

A second case is as follows. When the session attribute includes the bandwidth constraint condition corresponding to a session, similar to the foregoing descriptions, one session or at least two sessions may exist between the UE and the DN. Therefore, this step may include the following.

When one session (for example, a second session) exists between the UE and the DN, the first AN may perform, based on a bandwidth constraint condition corresponding to the second session in the session attribute, bandwidth constraint on a user packet received by the UE. For example, if the bandwidth constraint condition corresponding to the second session is that a maximum bandwidth is 100 kb/s, the first AN limits, based on the bandwidth constraint condition, a bandwidth of a user packet corresponding to the second session to a value not greater than 100 kb/s.

When at least two sessions exist between the UE and the DN, this step may include two possible implementations. In a first possible implementation, the first AN may first determine a bearer, corresponding to a user packet received by the UE, in bearers of the at least two sessions, determine, based on a correspondence between a bearer and a session attribute, a session attribute corresponding to the bearer, and further perform bandwidth constraint on the user packet based on a bandwidth constraint condition in the determined session attribute. For example, a session 1 and a session 2 exist between the UE and the DN, a bandwidth constraint condition corresponding to the session 1 is that a maximum bandwidth is 100 kb/s, a bandwidth constraint condition corresponding to the session 2 is that a maximum bandwidth is 50 kb/s, and the bearer corresponding to the user packet received by the UE is a bearer corresponding to the session 1. In this case, the first AN may limit a bandwidth of the user packet to a value not greater than 100 kb/s. In a second possible implementation, the first AN may calculate a bandwidth constraint condition of a user packet of the UE based on a bandwidth constraint condition corresponding to each session, and further perform bandwidth constraint on the user packet of the UE. Specifically, the first AN calculates a sum of bandwidth constraint conditions corresponding to the sessions in the UE, obtains, from the CP, a subscribed bandwidth constraint condition of the user packet, and when the sum of bandwidth constraint conditions is greater than the subscribed bandwidth constraint condition of the user packet, performs, based on the subscribed bandwidth constraint condition of the user packet, bandwidth constraint on the user packet received by the UE, or when the sum of bandwidth constraint conditions is less than or equal to the subscribed bandwidth constraint condition of the user packet, performs, based on the sum of bandwidth constraint conditions, bandwidth constraint on the user packet received by the UE. For example, if a bandwidth constraint condition corresponding to a session 1 is that a maximum bandwidth is 100 kb/s, a bandwidth constraint condition corresponding to a session 2 is that a maximum bandwidth is 50 kb/s, and the subscribed bandwidth constraint condition of the user packet of the UE is 120 kb/s, a bandwidth of the user packet of the UE is limited to a value not greater than 120 kb/s. However, if the subscribed bandwidth constraint condition of the user packet is 170 kb/s, a bandwidth of the user packet of the UE is limited to a value not greater than 150 kb/s. The subscribed bandwidth constraint condition of the user packet is obtained by the CP from a subscription database, and is sent to the first AN in a session establishment procedure.

It should also be noted that, after the first AN receives the context establishment request sent by the CP, the first AN may further complete radio resource configuration between the first AN and the UE, and the first AN sends a context establishment response to the CP. After a radio resource is successfully configured for the UE, the UE may further send a direct transfer message to the first AN, and the first AN sends a control complete message to the CP. This is not limited in this embodiment. In addition, optionally, the CP may further send an update bearer request to the UP, where the update bearer request carries an AN IP address and an AN TEID, and after receiving the update bearer request, the UP sends an update bearer response message to the CP. In addition, after the CP sends the context establishment request to the first AN, the CP may initiate a context modification procedure. In this case, a step of sending, by the CP, the session attribute to the first AN may include: sending a context modification request to the first AN, where the context modification request carries modified context information and a corresponding session attribute. Correspondingly, the first AN receives the context modification request sent by the CP. Then, the first AN may control the UE based on the modified context information and the corresponding session attribute that are carried in the context modification request. A control method is similar to step 307. Details are not described again in this embodiment. In addition, after receiving the context modification request, the first AN may reconfigure a radio resource between the first AN and the UE based on the modified context information and the corresponding session attribute, and return a context modification response to the CP. After the context modification response is returned to the CP, the UP may send downlink data to the first AN, and the first AN forwards the downlink data to the UE. Optionally, after the radio resource is successfully configured for the UE, the UE may send a direct transfer message to the first AN, and the first AN sends a control complete message to the CP. Then, the UE may send uplink data to the first AN, and the first AN forwards the uplink data to the UP.

It should be further noted that, in this embodiment, that control and forwarding are separated for the UP and the CP is merely used as an example. Optionally, control and forwarding may not be separated for the UP and the CP. In this case, the device control method is adaptively adjusted. For example, in step 303, after the CP receives the access request, the CP may send a packet forwarding rule to the UE, and step 304 is directly skipped. This is not limited in this embodiment.

In conclusion, according to the device control method provided in this embodiment, the CP sends the session attribute of the UE to the first AN accessed by the UE, so that the first AN can control the UE based on the session attribute. The first AN may control the UE at a session granularity based on the session attribute. In this way, the foregoing method resolves problems that because only UE-granularity control can be performed on UE, a particular quantity of radio resources are wasted when mobility management is performed on the UE and on-demand mobility management cannot be performed, thereby controlling the UE at a smaller granularity (e.g. a session granularity), improving accuracy and flexibility of controlling the UE, and reducing radio resources required in a control process.

When the first AN performs mobility management on the UE based on the session attribute, the first AN may first release a radio resource corresponding to a session/bearer that requires no mobility management, thereby reducing radio resources required in a handover procedure of the UE.

In addition, the first AN performs QoS control on the UE based on the session attribute, so that each session can be controlled, and control flexibility and accuracy are further improved.

In the foregoing embodiment, that the control request is the access request is merely used as an example for description. Optionally, when the control request is a connection establishment request or a service request, an execution process is similar. Details are not described again in this embodiment. In addition, when the control request is the service request, step 305 in the device control method may not include the control accept message, and other steps are similar. Details are not described again in this embodiment.

In the foregoing embodiment, that the CP obtains the session attribute by receiving the control request is merely used as an example. Optionally, the control request may not include the service requirement information used to determine the session attribute, and in this case, the CP may further obtain the session attribute in the following obtaining manners. Specifically, in a first possible implementation, the CP locally obtains the pre-configured session attribute of the UE. For example, a network administrator pre-configures, in the CP, the session attribute of the UE. When the CP needs to obtain the session attribute, the CP may directly read the session attribute locally. In a second possible implementation, the session attribute of the UE is used as subscription data and stored in a subscription server. In this case, the CP may send an obtaining request to the subscription server, and further receive the session attribute returned by the subscription server. A network administrator may dynamically send the session attribute to the CP using a policy decision network element; or the policy decision network element dynamically sends an index to the CP, and the CP queries, based on the index, the session attribute corresponding to the index. Certainly, optionally, the CP may further obtain the session attribute in another obtaining manner. This is not limited in this embodiment. In addition, when the UE includes at least two sessions, the foregoing session attribute may be a correspondence between a bearer and a session attribute.

Figure 11:
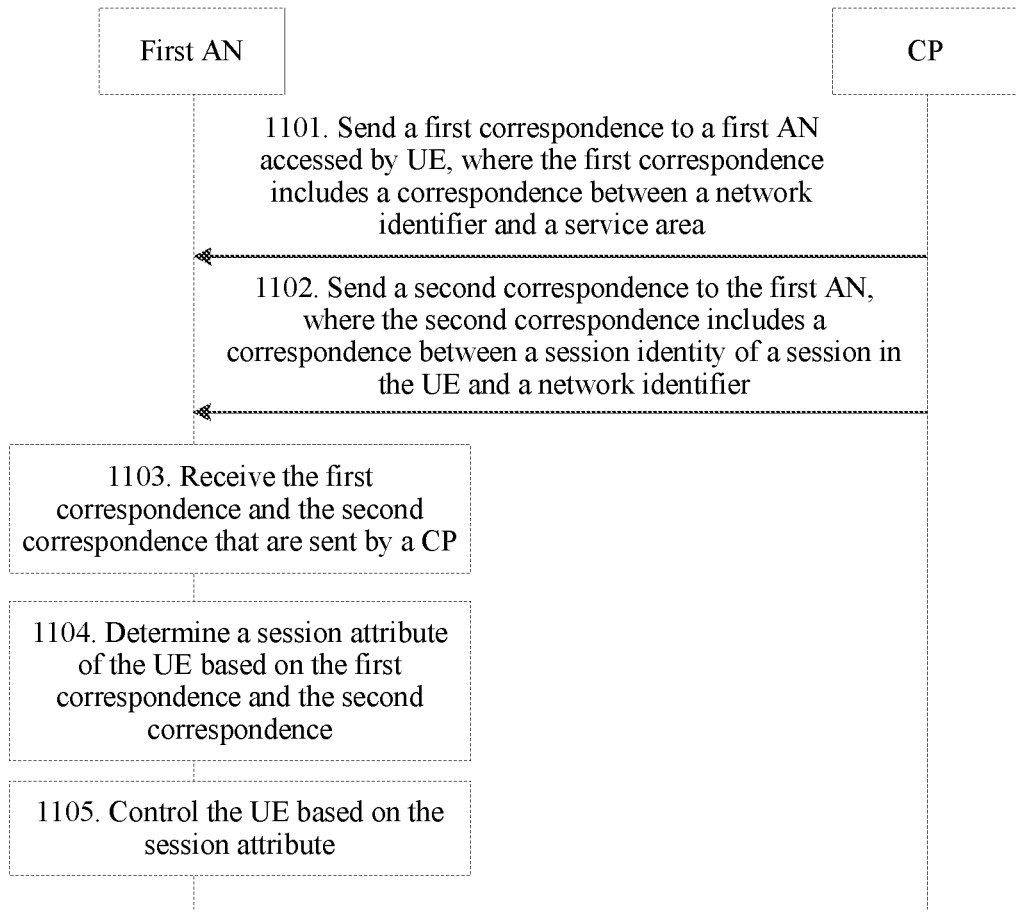
FIG. 11 is a flowchart of a device control method according to still another embodiment of the present disclosure.

That the CP sends the determined session attribute to the first AN after determining the session attribute is merely used as an example in the foregoing embodiment. Optionally, the CP may further notify the first AN of the session attribute in the following manner. In this case, referring to FIG. 11, a device control method includes the following steps.

Step 1101: A CP sends a first correspondence to a first AN accessed by UE, where the first correspondence includes a correspondence between a network identifier and a service area.

Figure 12:
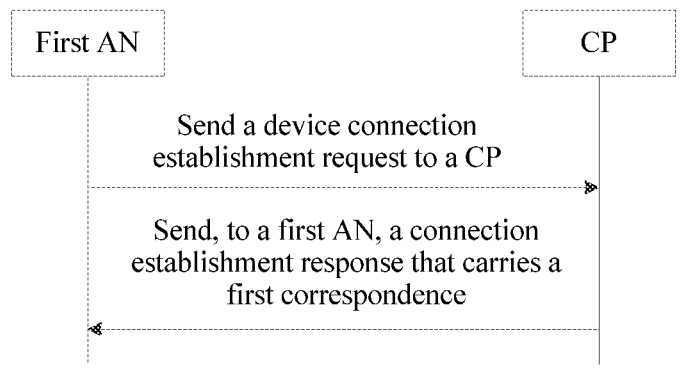
FIG. 12 is a flowchart of establishing a device connection according to still another embodiment of the present disclosure.

For example, the CP obtains the pre-configured first correspondence, and sends the first correspondence to the first AN in a process of establishing, by the first AN, a device connection to the CP. Optionally, when the first AN needs to establish a device connection to the CP, referring to FIG. 12, the first AN may send a device connection establishment request to the CP, and the CP sends, to the first AN, a connection establishment response that carries the first correspondence.

The network identifier may be a data network name (DNN), an IP address, an IP address prefix, or IP routing information. The network identifier is used to uniquely identify a network. Specific implementation of the network identifier is not limited in this embodiment.

Step 1102: The CP sends a second correspondence to the first AN, where the second correspondence includes a correspondence between a session identity of a session in the UE and a network identifier.

For example, the CP may obtain the correspondence between a session identity of a session and a network identifier in a session establishment procedure initiated by the UE, and then the CP may send the second correspondence to the first AN. Optionally, the CP may send, to the first AN, a correspondence between a session identity of each session and a network identifier in a context establishment request corresponding to the session. In other words, the CP may send, to the first AN, a context establishment request that carries a second correspondence of each session.

Optionally, when at least two sessions exist between the UE and a DN, the CP may send a second correspondence of each session to the first AN in a context establishment request of the session. In other words, this step may be executed a plurality of times. Details are not described in this embodiment.

The foregoing session identity of the session is obtained in the session establishment procedure by the CP from a session establishment request sent by the UE.

Step 1103: The first AN receives the first correspondence and the second correspondence that are sent by the CP.

Correspondingly, the first AN may receive the connection establishment response that is sent by the CP and that carries the first correspondence and the context establishment request that carries the second correspondence of the session.

Step 1104: The first AN determines a session attribute of the UE based on the first correspondence and the second correspondence.

The first AN may determine a correspondence between a session identity of a session and a service area based on the first correspondence between a network identifier and a service area and the second correspondence between a network identifier and a session identity. In other words, the first AN may determine session attributes of the sessions.

Optionally, after the first AN receives the second correspondence of each session in a session establishment procedure, the first AN may determine, in the session establishment procedure, a session attribute of the session based on the second correspondence of the session and the first correspondence received in advance.

Step 1105: The first AN controls the UE based on the session attribute.

This step is similar to step 307 in the foregoing embodiment. Details are not described herein again.

Figure 13:
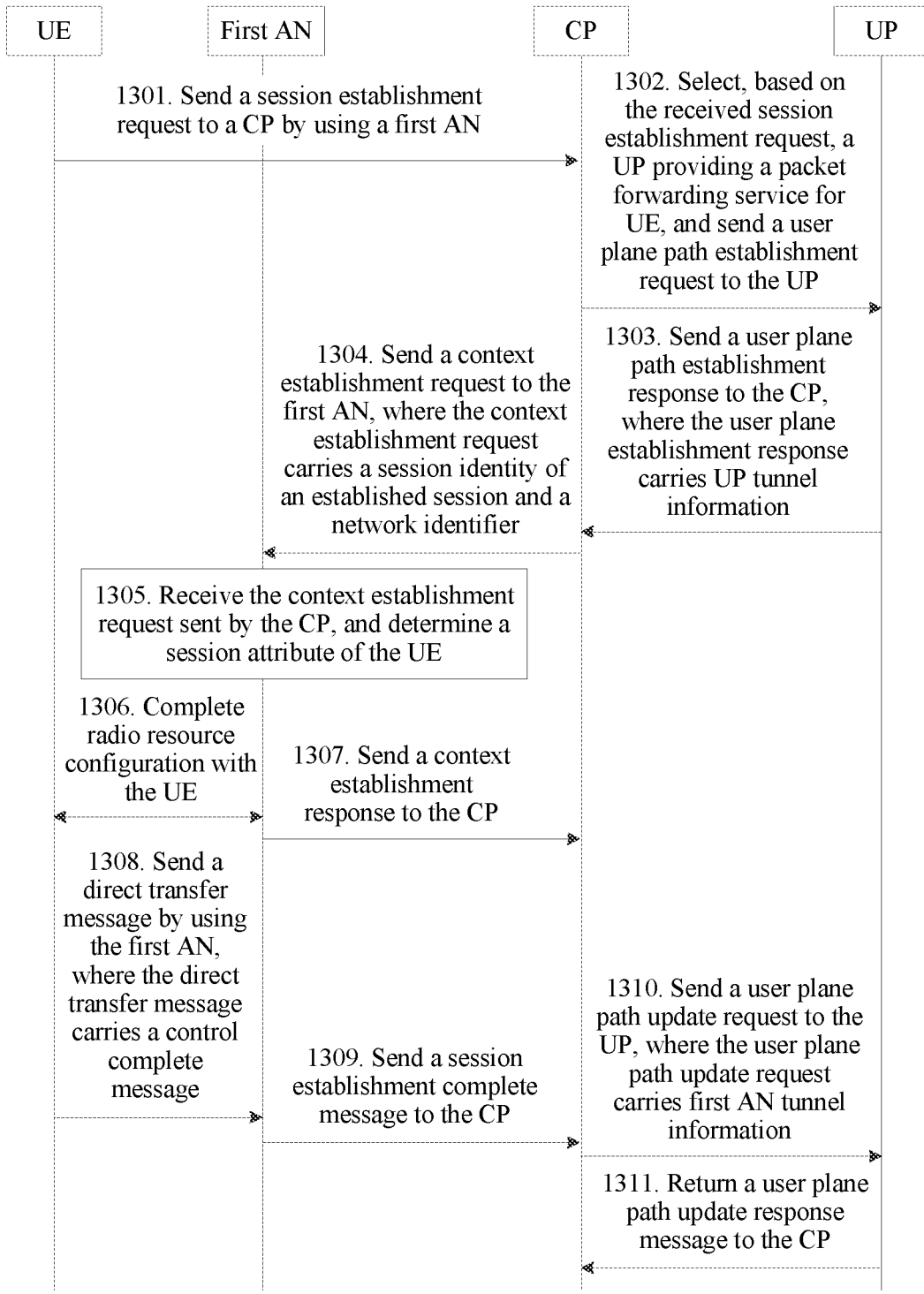
FIG. 13 is a flowchart of a session establishment procedure according to still another embodiment of the present disclosure.

In step 1104, FIG. 13 shows a possible session establishment procedure. As shown in FIG. 13, the session establishment procedure includes the following steps.

1301. The UE sends a session establishment request to the CP via the first AN.

The session establishment request carries a session identity. Optionally, a network identifier is further carried.

1302. The CP selects, based on the received session establishment request, a UP providing a packet forwarding service for the UE, and sends a user plane path establishment request to the UP.

After the CP receives the session establishment request, the CP may assign an IP address or an IP address prefix to the UE.

1303. The UP sends a user plane path establishment response to the CP, where the user plane establishment response carries UP tunnel information.

The UP tunnel information may include an IP address of the UP and identifier information used to indicate a tunnel endpoint of the UP. The identifier information may be a TEID.

1304. The CP sends a context establishment request to the first AN, where the context establishment request carries a session identity of an established session and a network identifier.

The session identity carried in the context establishment request may be an identity received by the CP from the session establishment request. The network identifier carried in the context establishment request may be an identifier received by the CP from the session establishment request, or may be an identifier obtained by the CP from a subscription server. This is not limited in this embodiment. The subscription server stores a subscribed network identifier of the UE.

Optionally, the context establishment request may further include the UP tunnel information.

1305. The first AN receives the context establishment request sent by the CP, and determines a session attribute of the UE.

1306. The first AN completes radio resource configuration with the UE.

1307. The first AN sends a context establishment response to the CP.

The context establishment response may carry first AN tunnel information. The first AN tunnel information includes an IP address of the first AN and a TEID of the first AN.

1308. The UE sends a direct transfer message via the first AN, where the direct transfer message carries a control complete message.

1309. The first AN sends a session establishment complete message to the CP.

1310. The CP sends a user plane path update request to the UP, where the user plane path update request carries first AN tunnel information.

1311. The UP returns a user plane path update response message to the CP.

In conclusion, according to the device control method provided in this embodiment, the CP sends the first correspondence and the second correspondence to the first AN, so that the first AN can determine, based on the first correspondence and the second correspondence, the session attribute of the UE accessing the first AN, and further control the UE based on the session attribute of the UE. The CP may control the UE at a session granularity based on the session attribute. In this way, the foregoing method resolves problems that because only UE-granularity control can be performed on UE, a particular quantity of radio resources are wasted when mobility management is performed on the UE and on-demand mobility management cannot be performed, thereby controlling the UE at a smaller granularity (e.g. a session granularity), improving accuracy and flexibility of controlling the UE, and reducing radio resources required in a control process.

Figure 14:
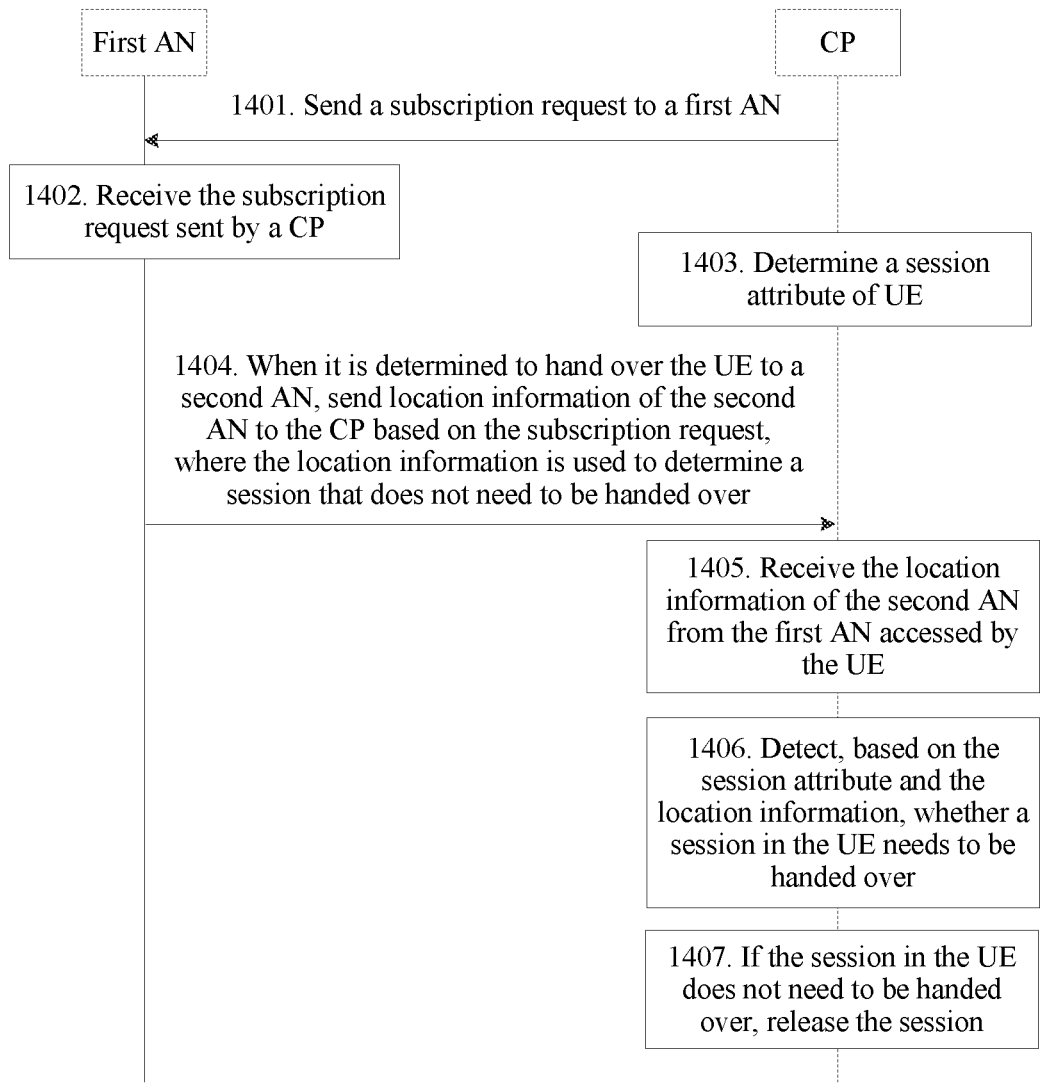
FIG. 14 is a flowchart of a device control method according to still another embodiment of the present disclosure.

FIG. 14 is a method flowchart of a device control method according to still another embodiment of the present disclosure. As shown in FIG. 14, the device control method includes the following steps.

Step 1401: A CP sends a subscription request to a first AN.

After the CP establishes a device connection to the first AN, the CP may send the subscription request to the first AN. The subscription request is used to request to subscribe to a UE handover event. In other words, when the first AN determines to hand over UE to another AN, the first AN needs to feed back an event notification to the CP.

Optionally, the CP may send the subscription request to the first AN in a registration procedure of the UE. That is, the CP sends the subscription request to the first AN in a registration procedure initiated by the UE to a network via the first AN. Optionally, the CP may send the subscription request to the first AN using an N2 message between the CP and the first AN. This is not limited herein.

The CP may further send the subscription request to the first AN in a session establishment procedure. That is, the CP sends the subscription request to the first AN in a process of establishing, by the UE, a session connection to a DN via the first AN. Optionally, the CP may send the subscription request to the first AN using an N2 message between the CP and the first AN.

Step 1402: The first AN receives the subscription request sent by the CP.

Step 1403: The CP determines a session attribute of UE.

This step is similar to the implementation in the foregoing embodiment. Details are not described herein again.

Step 1404: When determining to hand over the UE to a second AN, the first AN sends location information of the second AN to the CP based on the subscription request, where the location information is used to determine a session that does not need to be handed over.

Optionally, the first AN may send a measurement control message to the UE, receive a measurement report returned by the UE, and determine, based on the received measurement report, whether the UE needs to be handed over. If the first AN determines that the UE needs to be handed over, the first AN may send the location information of the second AN to the CP.

Step 1405: The CP receives the location information of the second AN from the first AN accessed by the UE.

Step 1406: The CP detects, based on the session attribute and the location information, whether a session in the UE needs to be handed over.

The step of detecting, by the CP, whether a session needs to be handed over is similar to step 403 in the foregoing embodiment. Details are not described herein again.

Optionally, if at least two sessions exist between the UE and the DN, the CP may detect, based on a session attribute of each session and the location information of the second AN, whether the session needs to be handed over.

Step 1407: If the session in the UE does not need to be handed over, the CP releases the session.

If the at least two sessions exist between the UE and the DN, the CP may determine that some sessions in the UE need to be handed over, while some sessions do not need to be handed over. In this case, the CP may release the determined sessions that do not to be handed over.

Optionally, this step may include the following two possible implementations:

In a first possible implementation, this step may include the following steps.

(1) The CP may determine, based on a detection result in step 1406, at least one of a session list of sessions that need to be handed over and a session list of sessions that do not need to be handed over.

(2) The CP sends an event notification to the first AN. The event notification carries at least one of the session list of sessions that need to be handed over and the session list of sessions that do not need to be handed over.

(3) After receiving the event notification, the first AN sends a handover request message to the second AN based on the event notification.

The handover request message carries a context of a session that needs to be handed over and a session identity of a session that does not need to be handed over.

Optionally, if the event notification includes the session list of sessions that need to be handed over, the first AN may directly obtain context information of a session that needs to be handed over, determine, based on session identities of all sessions in the UE and the session list of sessions that need to be handed over, a session identity of a session that does not need to be handed over, and send, to the second AN, a handover request message that carries the context information of the session that needs to be handed over and the session identity of the session that does not need to be handed over. Optionally, the first AN may send, to the second AN, a handover request message that carries context information of sessions and second indication information used to indicate a session that does not need to be handed over. This step is similar to step 1002 in the foregoing embodiment. Details are not described herein again.

Optionally, if the event notification includes the session list of sessions that do not need to be handed over, the first AN determines, based on the session list of sessions that do not need to be handed over and the sessions in the UE, a session other than the sessions that do not need to be handed over, that is, determines a session that needs to be handed over, obtains context information of the session that needs to be handed over, and sends, to the second AN, a handover request message that carries a session identity of a session that does not need to be handed over and the context information of the session that needs to be handed over. Alternatively, the first AN may further send, to the second AN, a handover request message that carries context information of all sessions in the UE and second indication information used to indicate a session that does not need to be handed over.

(4) The second AN receives the handover request message, establishes a radio resource corresponding to a session that needs to be handed over, and triggers the CP to release a session that does not need to be handed over.

This step is similar to the foregoing embodiment. Details are not described herein again. In addition, similar to the foregoing embodiment, before the second AN establishes the radio resource corresponding to the session that needs to be handed over, the second AN may further perform admission control on the session that needs to be handed over. In other words, the second AN detects whether the second AN allows handover of the session that needs to be handed over. If the second AN does not allow access of a session that needs to be handed over, the second AN still does not establish a radio resource corresponding to the session, but triggers the CP to release the session. This is not limited in this embodiment.

Figure 15A:
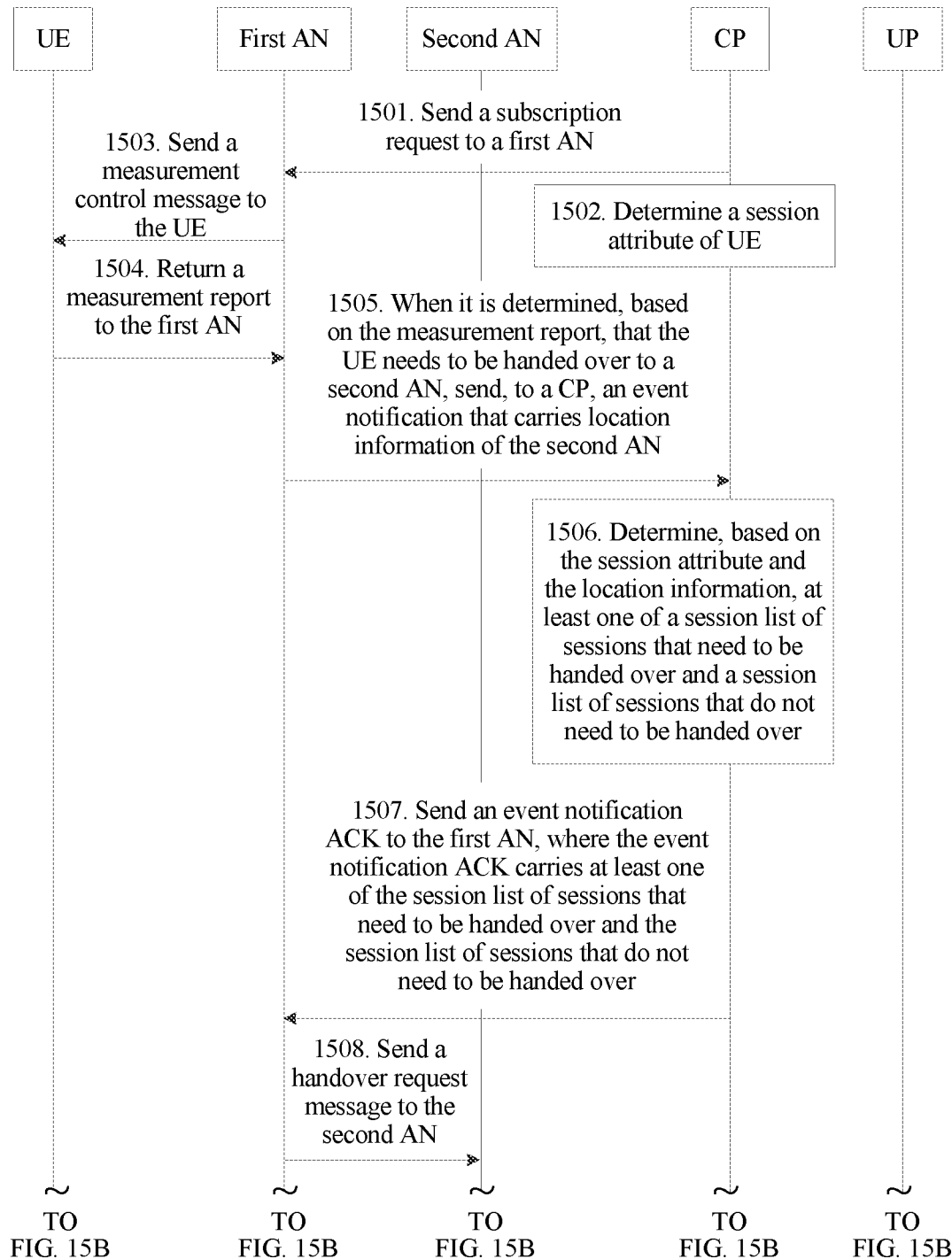
FIG. 15A and FIG. 15B are a flowchart of a device control method according to still another embodiment of the present disclosure.
Figure 15B:
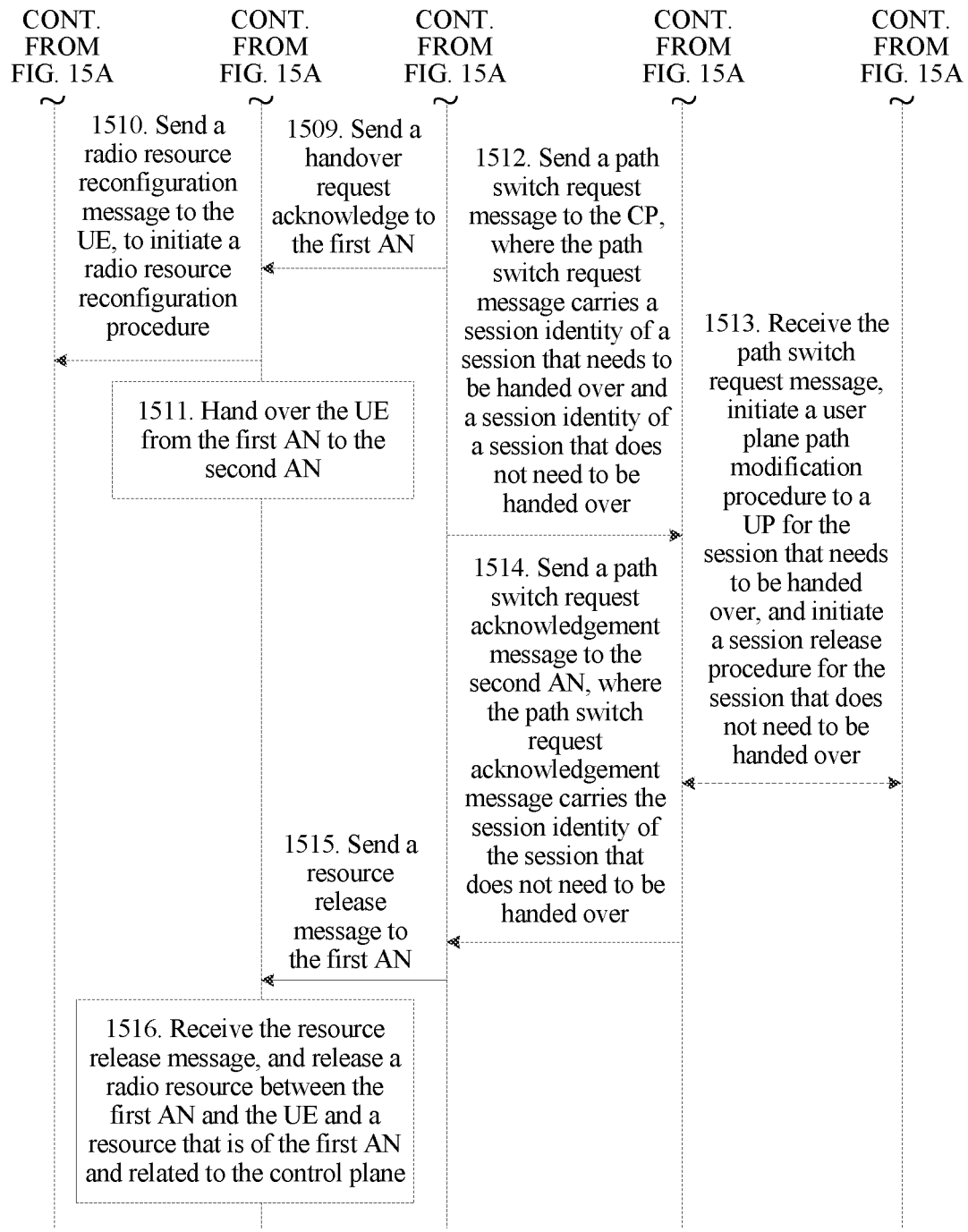

Optionally, the device control method may include other steps. As shown in FIG. 15A and FIG. 15B, the device control method includes the following steps.

1501. A CP sends a subscription request to a first AN.

1502. The CP determines a session attribute of UE.

1503. The first AN sends a measurement control message to the UE.

1504. The UE returns a measurement report to the first AN.

1505. When the first AN determines, based on the measurement report, that the UE needs to be handed over to a second AN, the first AN sends, to the CP, an event notification that carries location information of the second AN.

1506. The CP determines, based on the session attribute and the location information, at least one of a session list of sessions that need to be handed over and a session list of sessions that do not need to be handed over.

1507. The CP sends an event notification ACK to the first AN, where the event notification ACK carries at least one of the session list of sessions that need to be handed over and the session list of sessions that do not need to be handed over.

1508. The first AN sends a handover request message to the second AN.

1509. The second AN sends a handover request acknowledge to the first AN.

1510. The first AN sends a radio resource reconfiguration message to the UE, to initiate a radio resource reconfiguration procedure.

1511. Hand over the UE from the first AN to the second AN.

1512. The second AN sends a path switch request message to the CP, where the path switch request message carries a session identity of a session that needs to be handed over and a session identity of a session that does not need to be handed over.

Optionally, before sending the path switch request message, the second AN may perform admission control. When the second AN does not allow access of a session that needs to be handed over, the second AN still needs to trigger releasing of the session. Details are not described herein again.

1513. The CP receives the path switch request message, the CP initiates a user plane path modification procedure to a UP for the session that needs to be handed over, and the CP initiates a session release procedure for the session that does not need to be handed over.

1514. The CP sends a path switch request acknowledgement message to the second AN, where the path switch request acknowledgement message carries the session identity of the session that does not need to be handed over.

1515. The second AN sends a resource release message to the first AN.

1516. The first AN receives the resource release message, and releases a radio resource between the first AN and the UE and a resource that is of the first AN and related to the control plane.

In a second possible implementation, this step may include the following steps.

(1) The CP may determine, based on a detection result in step 1406, a session that does not need to be handed over.

Optionally, the CP may further determine a session that needs to be handed over.

(2) The CP releases the session that does not need to be handed over, and sends an event notification to the first AN, where the event notification carries context information of the session that needs to be handed over, and the context information of the session that needs to be handed over includes the session identity.

After determining the session that does not need to be handed over, the CP releases the session that does not need to be handed over. Optionally, the CP may further determine the context information of the session that needs to be handed over, and send, to the first AN, the event notification that carries the context information of the session that needs to be handed over.

(3) After receiving the event notification, the first AN sends a handover request message to the second AN based on the event notification, where the handover request message carries the context information of the session that needs to be handed over.

(4) The second AN receives the handover request message sent by the first AN, and establishes a radio resource corresponding to the session that needs to be handed over.

Optionally, the device control method may further include other steps. With reference to FIG. 15A and FIG. 15B, a difference between this implementation and the implementation in FIG. 15A and FIG. 15B lies in the following. The sixth step may be replaced by the following: The CP determines, based on the session attribute and the location information, a session that does not need to be handed over, and releases the session that does not need to be handed over. The seventh step may be replaced by the following. The CP sends an event notification ACK to the first AN, where the event notification ACK carries context information of the session that needs to be handed over. The twelfth step may be replaced by the following: The second AN sends a path switch request message to the CP, where the path switch request message carries a session identity of the session that needs to be handed over. The thirteenth step may be replaced by the following. The CP receives the path switch request message, and the CP initiates a user plane path modification procedure to a UP for the session that needs to be handed over. Details are not described herein again.

In conclusion, according to the device control method provided in this embodiment, the CP determines the session attribute of the UE, receives the location information of the second AN that is sent by the first AN accessed by the UE, and releases, based on the session attribute and the location information, the session that does not need to be handed over in a session of the UE. The CP may control the UE at a session granularity based on the session attribute. In this way, the foregoing method resolves problems that because only UE-granularity control can be performed on UE, a particular quantity of radio resources are wasted when mobility management is performed on the UE and on-demand mobility management cannot be performed, thereby controlling the UE at a smaller granularity (e.g. a session granularity), improving accuracy and flexibility of controlling the UE, and reducing radio resources required in a control process.

In the foregoing embodiments, steps related to the CP side may be independently implemented as a device control method on the CP side, steps related to the first AN side may be independently implemented as a device control method on the first AN side, and steps related to the second AN side may be independently implemented as a device control method on the second AN side.

Figure 16:
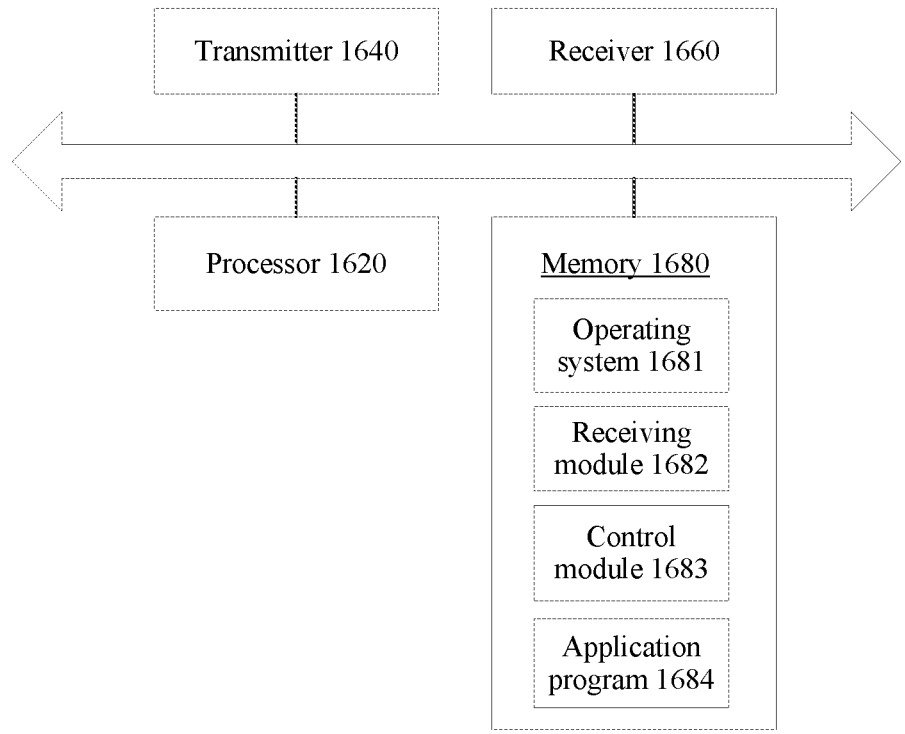
FIG. 16, FIG. 17, FIG. 18, FIG. 19, FIG. 20, FIG. 21, and FIG. 22 are schematic structural diagrams of device control apparatuses according to embodiments of the present disclosure.

FIG. 16 is a schematic structural diagram of a device control apparatus according to an example embodiment of the present disclosure. The device control apparatus may be implemented as all or a part of a first AN. The first AN includes a processor 1620, a transmitter 1640 connected to the processor 1620, and a receiver 1660 connected to the processor 1620. A person skilled in the art may understand that a structure of the first AN shown in FIG. 16 constitutes no limitation on the first AN, and may include more or fewer components than those shown in the figure, or combine some components, or have a different component arrangement. For example, the first AN further includes a memory 1680, a power supply, and the like.

The processor 1620 is a control center of the first AN, is connected to all parts of the entire first AN using various interfaces and lines, and executes various functions of the first AN and processes data by running or executing a software program and/or a module stored in the memory 1680 and by invoking data stored in the memory 1680, to perform overall control on the first AN. Optionally, the processor 1620 may include one or more processing cores. Optionally, an application processor and a modem processor may be integrated into the processor 1620. The application processor mainly processes an operating system, a user interface, an application program, and the like. The modem processor mainly processes wireless communication. It may be understood that the foregoing modem processor may not be integrated into the processor 1620, and the foregoing modem processor may be independently implemented as a chip.

The memory 1680 may be configured to store the software program and the module. The processor 1620 runs the software program and the module stored in the memory 1680, to execute various functional applications and process data. The memory 1680 may mainly include a program storage area and a data storage area. The program storage area may be used to store an operating system 1681, a receiving module 1682, a control module 1683, at least one application program 1684 required by another function, and the like. The processor 1620 invokes modules stored in the memory 1680, to execute the device control method related to the first AN side in the foregoing embodiments. The data storage area may be used to store data, or the like (for example, audio data and a phone book) created based on use of the first AN. In addition, the memory 1680 may be implemented by any type of volatile storage device or nonvolatile storage device, or a combination thereof.

The transmitter 1640 may include a radio frequency transmit component, for example, an antenna. The transmitter 1640 is configured to send data or information carried in a wireless signal. The wireless signal may be a time-frequency resource in a mobile communications system.

The receiver 1660 may include a radio frequency receive component, for example, an antenna. The receiver 1660 is configured to receive data or information carried in a wireless signal. The wireless signal may be a time-frequency resource in a mobile communications system.

It should be noted that, in the foregoing embodiment, that the device control apparatus is implemented as all or a part of the first AN is merely used as an example. Optionally, the apparatus may be implemented as all or a part of a CP or a second AN. In addition, when the apparatus is implemented as all or a part of the CP or the second AN, the receiving module 1682 and the control module 1683 that are stored in the program storage area of the memory 1680 may be replaced by other modules. In this case, the processor 1620 invokes modules stored in the memory 1680, to implement the device control method related to the CP side or the second AN side in the foregoing embodiments.

Figure 17:
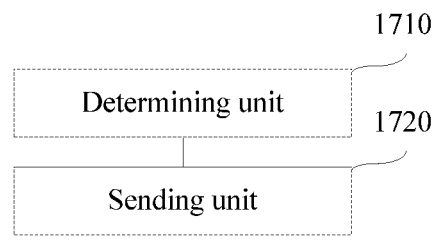

FIG. 17 is a schematic structural diagram of a device control apparatus according to an embodiment of the present disclosure. The device control apparatus is used in a CP. As shown in FIG. 17, the device control apparatus may include a determining unit 1710 and a sending unit 1720.

The determining unit 1710 is configured to determine a session attribute of user equipment UE.

The sending unit 1720 is configured to send the session attribute to a first access network AN accessed by the UE, where the session attribute is used by the first AN to control the UE.

Optionally, when at least two sessions exist between the UE and a data network DN, the determining unit 1710 is further configured to determine a correspondence between a session attribute of each of the at least two sessions and each bearer in the UE, where at least one bearer corresponds to a session; and the sending unit 1720 is further configured to send the session attribute to the first AN based on the correspondence.

Optionally, the bearer is a single service flow or an aggregate of at least two service flows.

Optionally, the determining unit 1710 is further configured to: receive a control request sent by the UE via the first AN, and determine the session attribute of the UE based on service requirement information carried in the control request; or obtain the pre-configured session attribute of the UE; or send an obtaining request to a subscription server, and receive the session attribute returned by the subscription server; or receive the session attribute sent by a policy decision network element; or receive an index sent by the policy decision network element, and determine the session attribute corresponding to the index.

Optionally, the control request is an access request, a connection establishment request, or a service request.

Optionally, the sending unit 1720 is further configured to: send, to the first AN, a context establishment request that carries the session attribute; or send, to the first AN, a context modification request that carries the session attribute.

Optionally, the session attribute includes one or more of the following: a service area corresponding to a session and a bandwidth constraint condition corresponding to a session.

In conclusion, the device control apparatus provided in this embodiment sends the session attribute of the UE to the first AN accessed by the UE, so that the first AN can control the UE based on the session attribute. The first AN may control the UE at a session granularity based on the session attribute. In this way, the foregoing device control apparatus resolves problems that because only UE-granularity control can be performed on UE, a particular quantity of radio resources are wasted when mobility management is performed on the UE and on-demand mobility management cannot be performed, thereby controlling the UE at a smaller granularity (e.g. a session granularity), improving accuracy and flexibility of controlling the UE, and reducing radio resources required in a control process.

When the first AN performs mobility management on the UE based on the session attribute, the first AN may first delete a radio resource corresponding to a session/bearer that requires no mobility management, thereby reducing radio resources required in a handover procedure of the UE.

In addition, the first AN performs QoS control on the UE based on the session attribute, so that each session can be controlled, and control flexibility and accuracy are further improved.

Figure 18:
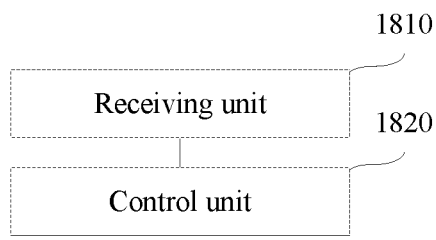

FIG. 18 is a schematic structural diagram of a device control apparatus according to an embodiment of the present disclosure. The device control apparatus may be used in a first AN. As shown in FIG. 18, the device control apparatus may include a receiving unit 1810 and a control unit 1820.

The receiving unit 1810 is configured to receive a session attribute of user equipment UE sent by a control plane CP network element.

The control unit 1820 is configured to control the UE based on the session attribute.

Optionally, when at least two sessions exist between the UE and a data network DN, the receiving unit 1810 is further configured to receive the session attribute of the UE sent by the CP based on a correspondence, where the correspondence includes a correspondence between a session attribute of each of the at least two sessions and each bearer in the UE, and at least one bearer corresponds to a session; and the control unit 1820 is further configured to control the UE based on the correspondence.

Optionally, the session attribute includes one or more of the following: a service area corresponding to a session and a bandwidth constraint condition corresponding to a session.

Optionally, when a first session exists between the UE and a data network DN, and the session attribute includes a service area corresponding to the first session, the control unit 1820 is further configured to: before the UE is handed over from the first AN to a second AN, if the second AN is not in the service area corresponding to the first session, release a first resource of the first session that does not need to be handed over, and send a handover request message to the second AN, where the handover request message is used to instruct the second AN to trigger the CP, so that the CP releases a second resource of the first session in a user plane UP network element; or before the UE is handed over from the first AN to a second AN, if the second AN is not in the service area corresponding to the first session, send indication information to the CP, so that the CP initiates releasing of a first resource of the first session in the first AN and a second resource of the first session in a UP.

Optionally, when the at least two sessions exist between the UE and the data network DN, and the session attribute includes a service area corresponding to each of the at least two sessions, the control unit 1820 is further configured to: before the UE is handed over from the first AN to a second AN, if the second AN is not in a service area corresponding to any of the at least two sessions, release, based on the correspondence, a third resource of a bearer of the at least two sessions that does not need to be handed over, and send a handover request message to the second AN based on the correspondence, where the handover request message is used to instruct the second AN to trigger the CP, so that the CP releases a fourth resource, in a user plane UP network element, of the bearer that does not need to be handed over; or before the UE is handed over from the first AN to a second AN, if the second AN is not in a service area corresponding to any of the at least two sessions, send indication information to the CP, so that the CP initiates releasing of a third resource, in the first AN, of a bearer of the at least two sessions that does not need to be handed over and releasing of a fourth resource of the bearer in a UP.

Optionally, when a second session exists between the UE and a data network DN, and the session attribute includes a bandwidth constraint condition corresponding to the second session, the control unit 1820 is further configured to perform, based on the bandwidth constraint condition corresponding to the second session, bandwidth constraint on a user packet received by the UE.

Optionally, when the at least two sessions exist between the UE and the data network DN, and the session attribute includes a bandwidth constraint condition corresponding to each of the at least two sessions, the control unit 1820 is further configured to: determine a bearer, corresponding to a user packet received by the UE, in bearers of the at least two sessions; obtain, based on the correspondence, a session attribute corresponding to the determined bearer; and perform bandwidth constraint on the user packet based on a bandwidth constraint condition corresponding to a session in the obtained session attribute.

Optionally, when the at least two sessions exist between the UE and the data network DN, and the session attribute includes a bandwidth constraint condition corresponding to each of the at least two sessions, the control unit 1820 is further configured to: calculate, based on the bandwidth constraint condition corresponding to each session, a sum of bandwidth constraint conditions corresponding to the sessions in the UE; obtain, from the CP, a subscribed bandwidth constraint condition of the user packet; and when the sum of bandwidth constraint conditions is greater than the subscribed bandwidth constraint condition of the user packet, perform, based on the subscribed bandwidth constraint condition of the user packet, bandwidth constraint on a user packet received by the UE; or when the sum of bandwidth constraint conditions is less than or equal to the subscribed bandwidth constraint condition of the user packet, perform, based on the sum of bandwidth constraint conditions, bandwidth constraint on a user packet received by the UE.

When the at least two sessions exist between the UE and the data network DN, and the session attribute includes a bandwidth constraint condition corresponding to each of the at least two sessions, optionally, the control unit 1820 is further configured to: calculate, based on the bandwidth constraint condition corresponding to each session, a sum of bandwidth constraint conditions corresponding to the sessions in the UE; obtain, from the CP, a subscribed bandwidth constraint condition of the user packet; and when the sum of bandwidth constraint conditions is greater than the subscribed bandwidth constraint condition of the user packet, perform, based on the subscribed bandwidth constraint condition of the user packet, bandwidth constraint on a user packet received by the UE; or when the sum of bandwidth constraint conditions is less than or equal to the subscribed bandwidth constraint condition of the user packet, perform, based on the sum of bandwidth constraint conditions, bandwidth constraint on a user packet received by the UE.

Optionally, the receiving unit 1810 is further configured to: receive a context establishment request that is sent by the CP and that carries the session attribute; or receive a context modification request that is sent by the CP and that carries the session attribute.

In conclusion, the device control apparatus provided in this embodiment receives the session attribute of the UE sent by the CP and controls the UE based on the session attribute. The UE may be controlled at a session granularity based on the session attribute. In this way, the foregoing device control apparatus resolves problems that because only UE-granularity control can be performed on UE, a particular quantity of radio resources are wasted when mobility management is performed on the UE and on-demand mobility management cannot be performed, thereby controlling the UE at a smaller granularity (e.g. a session granularity), improving accuracy and flexibility of controlling the UE, and reducing radio resources required in a control process.

When mobility management is performed on the UE based on the session attribute, a radio resource corresponding to a session/bearer that requires no mobility management may be first deleted, thereby reducing radio resources required in a handover procedure of the UE.

In addition, QoS control is performed on the UE based on the session attribute, so that each session can be controlled, and control flexibility and accuracy are further improved.

An embodiment of the present disclosure provides a schematic structural diagram of a device control apparatus. The device control apparatus may be used in a CP. The device control apparatus may include a sending unit.

The sending unit is configured to send a first correspondence to a first access network AN accessed by user equipment UE. The first correspondence includes a correspondence between a network identifier and a service area.

The sending unit is further configured to send a second correspondence to the first AN. The second correspondence includes a correspondence between a session identity of a session in the UE and a network identifier, the first correspondence and the second correspondence are used to determine a session attribute of the UE, and the session attribute is used to control the UE.

Optionally, the sending unit is further configured to: send, to the first AN after the CP receives a device connection establishment request from the first AN, a connection establishment response that carries the first correspondence.

Optionally, the sending unit is further configured to: send, by the CP to the first AN, a context establishment request that carries the second correspondence.

In conclusion, according to the device control apparatus provided in this embodiment, the CP sends the first correspondence and the second correspondence to the first AN, so that the first AN can determine, based on the first correspondence and the second correspondence, the session attribute of the UE accessing the first AN, and further control the UE based on the session attribute of the UE. The CP may control the UE at a session granularity based on the session attribute. In this way, the foregoing device control apparatus resolves problems that because only UE-granularity control can be performed on UE, a particular quantity of radio resources are wasted when mobility management is performed on the UE and on-demand mobility management cannot be performed, thereby controlling the UE at a smaller granularity (e.g. a session granularity), improving accuracy and flexibility of controlling the UE, and reducing radio resources required in a control process.

Figure 19:
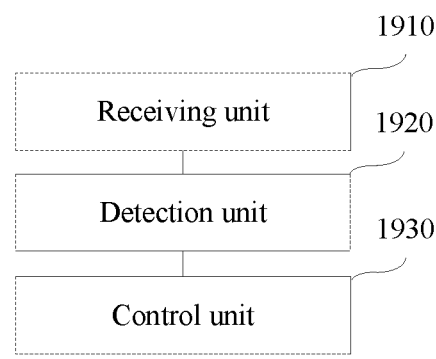

FIG. 19 is a schematic structural diagram of a device control apparatus according to an embodiment of the present disclosure. The device control apparatus may be used in a first AN. As shown in FIG. 19, the device control apparatus may include a receiving unit 1910, a detection unit 1920, and a control unit 1930.

The receiving unit 1910 is configured to receive a first correspondence and a second correspondence that are sent by a control plane CP network element. The first correspondence includes a correspondence between a network identifier and a service area, and the second correspondence includes a correspondence between a session identity of a session in user equipment UE accessing the first AN and a network identifier.

The detection unit 1920 is configured to determine a session attribute of the UE based on the first correspondence and the second correspondence.

The control unit 1930 is configured to control the UE based on the session attribute.

In conclusion, the device control apparatus provided in this embodiment receives the first correspondence and the second correspondence that are sent by the CP, determines, based on the first correspondence and the second correspondence, the session attribute of the UE accessing the first AN, and further controls the UE based on the session attribute of the UE. The CP may control the UE at a session granularity based on the session attribute. In this way, the foregoing device control apparatus resolves problems that because only UE-granularity control can be performed on UE, a particular quantity of radio resources are wasted when mobility management is performed on the UE and on-demand mobility management cannot be performed, thereby controlling the UE at a smaller granularity (e.g. a session granularity), improving accuracy and flexibility of controlling the UE, and reducing radio resources required in a control process.

Figure 20:
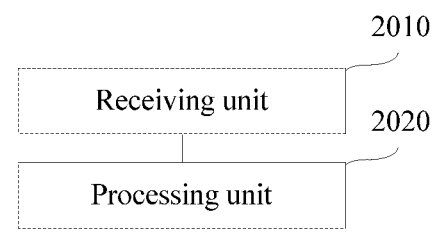

FIG. 20 is a schematic structural diagram of a device control apparatus according to an embodiment of the present disclosure. The device control apparatus may be used in a second AN. As shown in FIG. 20, the device control apparatus may include a receiving unit 2010 and a processing unit 2020.

In a possible implementation, the receiving unit 2010 is configured to receive a handover request message that is sent by a first AN and that carries a session attribute, where the session attribute is a session attribute of a session in UE accessing the first AN; the processing unit 2020 is configured to determine, based on the session attribute, a session that needs to be handed over and a session that does not need to be handed over; and the processing unit 2020 is further configured to: establish a radio resource corresponding to the session that needs to be handed over, and trigger a control plane CP network element to release the session that does not need to be handed over.

Optionally, in another possible implementation, the receiving unit 2010 is configured to receive a handover request message sent by a first AN, where the handover request message carries context information of a session that needs to be handed over and a session identity of a session that does not need to be handed over; and the processing unit 2020 is configured to: establish a radio resource corresponding to the session that needs to be handed over, and trigger a control plane CP network element to release the session that does not need to be handed over.

In conclusion, after receiving the handover request message, the device control apparatus provided in this embodiment triggers, based on the handover request message, the CP to release the session that does not need to be handed over. This resolves problems that because only UE-granularity control can be performed on UE, a particular quantity of radio resources are wasted when mobility management is performed on the UE and on-demand mobility management cannot be performed, thereby controlling the UE at a smaller granularity (e.g. a session granularity), improving accuracy and flexibility of controlling the UE, and reducing radio resources required in a control process.

Figure 21:
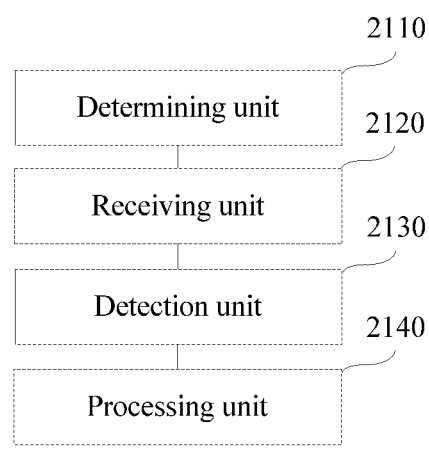

FIG. 21 is a schematic structural diagram of a device control apparatus according to an embodiment of the present disclosure. The device control apparatus may be used in a CP. As shown in FIG. 21, the device control apparatus may include a determining unit 2110, a receiving unit 2120, a detection unit 2130, and a processing unit 2140.

The determining unit 2110 is configured to determine a session attribute of user equipment UE.

The receiving unit 2120 is configured to receive location information of a second AN from a first access network AN accessed by the UE.

The detection unit 2130 is configured to detect, based on the session attribute and the location information, whether a session in the UE needs to be handed over.

The processing unit 2140 is configured to release, by the CP, the session in the UE when the session does not need to be handed over.

Optionally, the apparatus further includes: a sending unit, configured to send a subscription request to the first AN, where the subscription request is used to instruct the first AN to send the location information of the second AN to the CP before the UE is handed over from the first AN to the second AN.

In conclusion, according to the device control apparatus provided in this embodiment, the CP determines the session attribute of the UE, receives the location information of the second AN that is sent by the first AN accessed by the UE, and releases, based on the session attribute and the location information, a session that does not need to be handed over in a session of the UE. The CP may control the UE at a session granularity based on the session attribute. In this way, the foregoing device control apparatus resolves problems that because only UE-granularity control can be performed on UE, a particular quantity of radio resources are wasted when mobility management is performed on the UE and on-demand mobility management cannot be performed, thereby controlling the UE at a smaller granularity (e.g. a session granularity), improving accuracy and flexibility of controlling the UE, and reducing radio resources required in a control process.

Figure 22:
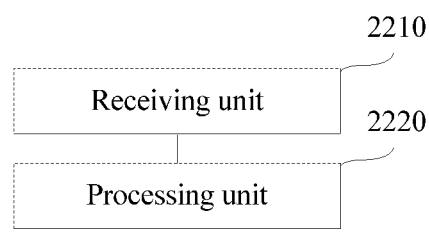

FIG. 22 is a schematic structural diagram of a device control apparatus according to an embodiment of the present disclosure. The device control apparatus may be used in a first AN. As shown in FIG. 22, the device control apparatus may include a receiving unit 2210 and a processing unit 2220.

The receiving unit 2210 is configured to receive a subscription request sent by a control plane CP network element.

The processing unit 2220 is configured to send, when it is determined to hand over user equipment UE to a second AN, location information of the second AN to the CP based on the subscription request. The location information is used to determine a session that does not need to be handed over.

In conclusion, according to the device control apparatus provided in this embodiment, the CP determines a session attribute of the UE, receives the location information of the second AN that is sent by the first AN accessed by the UE, and releases, based on the session attribute and the location information, the session that does not need to be handed over in a session of the UE. The CP may control the UE at a session granularity based on the session attribute. In this way, the foregoing device control apparatus resolves problems that because only UE-granularity control can be performed on UE, a particular quantity of radio resources are wasted when mobility management is performed on the UE and on-demand mobility management cannot be performed, thereby controlling the UE at a smaller granularity (e.g. a session granularity), improving accuracy and flexibility of controlling the UE, and reducing radio resources required in a control process.

It should be understood that, unless an exception is clearly supported in the context, a singular form "a" ("a", "an", or "the") used in this specification also includes a plural form. It should be further understood that "and/or" used in this specification is any or all possible combinations including one or more associated listed items.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, an optical disc, or the like.

The foregoing descriptions are merely example embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method, comprising:
   determining, by a control plane network element (CP), a plurality of session attributes of a user equipment (UE), wherein at least two sessions exist between the UE and a data network (DN), and wherein the plurality of session attributes comprises a plurality of bandwidth constraint conditions corresponding to the at least two sessions, and each session attribute of the plurality of session attributes comprises a respective bandwidth constraint condition of the plurality of bandwidth constraint conditions and corresponds to a respective session of the at least two sessions; and
   sending, by the CP, the plurality of session attributes to a first access network (AN) node accessed by the UE;
   receiving, by the first AN node, the plurality of session attributes;
   calculating, by the first AN node based on the plurality of bandwidth constraint conditions corresponding to the at least two sessions, a sum of the bandwidth constraint conditions of the plurality of bandwidth constraint conditions corresponding to the at least two sessions;
   obtaining, by the first AN node from the CP, a subscribed bandwidth constraint condition of user packet; and
   in response to the sum of the bandwidth constraint conditions being greater than the subscribed bandwidth constraint condition of the user packet, performing, by the first AN node based on the subscribed bandwidth constraint condition of the user packet, bandwidth constraint on a user packet received by the UE; or in response to the sum of the bandwidth constraint conditions being less than or equal to the subscribed bandwidth constraint condition of the user packet, performing, by the first AN node based on the sum of bandwidth constraint conditions, bandwidth constraint on a user packet received by the UE.

2. The method according to claim 1, wherein determining the plurality of session attributes comprises:
   determining, by the CP, a correspondence between a first session attribute of the plurality of session attributes and a bearer in the UE, wherein the bearer corresponds to the first session; and
   wherein sending, by the CP, the plurality of session attributes to the first AN node accessed by the UE comprises:
      sending, by the CP, the first session attribute to the first AN node based on the correspondence.

3. The method according to claim 2, wherein the bearer is a single service flow.

4. The method according to claim 2, wherein the bearer is an aggregate of at least two service flows.

5. The method according to claim 1, wherein determining the plurality of session attributes comprises:
   obtaining, by the CP, the a first session attribute of the plurality of session attributes of the UE, wherein the first session attribute is pre-configured.

6. The method according to claim 1, wherein determining the plurality of session attributes comprises:
   sending, by the CP, a request to a subscription server, and receiving a first session attribute of the plurality of session attributes from the subscription server.

7. The method according to claim 1, wherein determining the plurality of session attributes comprises:
   receiving, by the CP, a first session attribute of the plurality of session attributes from a policy decision network element.

8. The method according to claim 1, wherein each of the plurality of session attributes further comprises a respective service area corresponding to the respective session.

9. The method according to claim 1, wherein the at least two sessions comprise a first session and a second session, and receiving the plurality of session attributes comprises:
   receiving, by the first AN node, a first session attribute of the UE from the CP based on a first correspondence, wherein the first correspondence is between the first session attribute of the first session and a first bearer in the UE, wherein the first bearer corresponds to the first session.

10. The method according to claim 9, further comprising:
    determining, by the first AN node, the first bearer corresponding to a user packet received by the UE, from a plurality of bearers corresponding to the first session and the second session.

11. The method according to claim 9, further comprising:
    before the UE is handed over from the first AN node to a second AN node, sending, by the first AN node to the second AN node, a handover request message that carries the first session attribute, wherein the handover request message instructs the second AN node to trigger the CP to release the first session when the second AN node determines, based on the first session attribute, that the first session does not need to be handed over; or
    before the UE is handed over from the first AN node to a second AN node, when the first AN node determines, based on the first session attribute, that the first session does not need to be handed over, sending, by the first AN node, a handover request message to the second AN node, wherein the handover request message carries a session identity of the first session that does not need to be handed over, and the handover request message instructs the second AN node to trigger the CP to release the first session; or
    before the UE is handed over from the first AN node to a second AN node, when the first AN node determines, based on the first session attribute, that the first session does not need to be handed over, sending, by the first AN node, indication information to the CP, wherein the indication information instructs the CP to release the first session.

12. The method according to claim 9, wherein the first session attribute comprises a service area corresponding to each of the first session and the second session, and the method further comprises:
    before the UE is handed over from the first AN node to a second AN node, sending, by the first AN node to the second AN node, a handover request message that carries the session attribute, wherein the handover request message instructs the second AN node to determine a session that needs to be handed over and a session that does not need to be handed over, establish a radio resource corresponding to the session that needs to be handed over, and trigger the CP to release the session that does not need to be handed over; or
    before the UE is handed over from the first AN node to a second AN node, determining, by the first AN node based on the session attribute, a session that does not need to be handed over, and sending a handover request message to the second AN, wherein the handover request message carries context information of a session that needs to be handed over and a session identity of the session that does not need to be handed over, and the handover request message instructs the second AN node to establish a radio resource corresponding to the session that needs to be handed over, and trigger the CP to release the session that does not need to be handed over; or
    before the UE is handed over from the first AN node to a second AN node, when the first AN node determines, based on the session attribute, a session that does not need to be handed over, sending, by the first AN node, indication information to the CP, causing the CP to release a bearer of the session that does not need to be handed over.

13. The method according to claim 9, wherein receiving the first session attribute comprises:
    receiving, by the first AN from the CP, a context establishment request that carries the first session attribute.

14. The method according to claim 9, wherein receiving the first session attribute comprises:
    receiving, by the first AN node from the CP, a context modification request that carries the first session attribute.

15. A system, comprising:
    a first access network (AN) node; and
    a control plane network element (CP), configured to:
       determine a plurality of session attributes of a user equipment (UE), wherein at least two sessions exist between the UE and a data network (DN), and wherein the plurality of session attributes comprises a plurality of bandwidth constraint conditions corresponding to the at least two sessions, and each session attribute of the plurality of session attributes comprises a respective bandwidth constraint condition of the plurality of bandwidth constraint conditions and corresponds to a respective session of the at least two sessions; and send the plurality of session attributes to the first AN node accessed by the UE; and wherein the first AN node is configured to:
receive the plurality of session attributes;
calculate, based on the plurality of bandwidth constraint conditions corresponding to the at least two sessions, a sum of the bandwidth constraint conditions of the plurality of bandwidth constraint conditions corresponding to the at least two sessions;
obtain, from the CP, a subscribed bandwidth constraint condition of user packet; and
in response to the sum of the bandwidth constraint conditions being greater than the subscribed bandwidth constraint condition of the user packet, perform, based on the subscribed bandwidth constraint condition of the user packet, bandwidth constraint on a user packet received by the UE; or in response to the sum of the bandwidth constraint conditions being less than or equal to the subscribed bandwidth constraint condition of the user packet, performing, based on the sum of bandwidth constraint conditions, bandwidth constraint on a user packet received by the UE.

16. The system according to claim 15, wherein:
the CP being configured to determine the plurality of session attributes comprises the CP being configured to:
determine a correspondence between a first session attribute of the plurality of session attributes and a bearer in the UE, wherein the bearer corresponds to the first session; and
wherein the CP being configured to send the plurality of session attributes to the first AN node accessed by the UE comprises the CP being configured to:
send the first session attribute to the first AN node based on the correspondence.

17. The system according to claim 16, wherein the bearer is a single service flow.

18. The system according to claim 16, wherein the bearer is an aggregate of at least two service flows.

19. The system according to claim 15, wherein the CP being configured to determine the plurality of session attributes comprises the CP being configured to:
obtain a first session attribute of the plurality of session attributes of the UE, wherein the first session attribute is pre-configured.

20. The system according to claim 15, wherein the CP being configured to determine the plurality of session attributes comprises the CP being configured to:
send a request to a subscription server, and receive a first session attribute of the plurality of session attributes from the subscription server.

21. The system according to claim 15, wherein the CP being configured to determine the plurality of session attributes comprises the CP being configured to:
receive a first session attribute of the plurality of session attributes from a policy decision network element.

22. The system according to claim 15, wherein each of the plurality of session attributes further comprises a respective service area corresponding to the respective session.

23. The system according to claim 15, wherein the at least two sessions comprise a first session and a second session, and the first AN node being configured to receive the plurality of session attributes comprises the first AN node being configured to:
receive a first session attribute of the UE from the CP based on a first correspondence, wherein the first correspondence is between the first session attribute of the first session and a first bearer in the UE, wherein the first bearer corresponds to the first session.

24. The system according to claim 23, wherein the first AN node is further configured to:
determine the first bearer corresponding to a user packet received by the UE, from a plurality of bearers corresponding to the first session and the second session.

25. The system according to claim 23, wherein the first AN node is further configured to:
before the UE is handed over from the first AN node to a second AN node, send, to the second AN node, a handover request message that carries the first session attribute, wherein the handover request message instructs the second AN node to trigger the CP to release the first session when the second AN node determines, based on the first session attribute, that the first session does not need to be handed over; or
before the UE is handed over from the first AN node to a second AN node, when the first AN node determines, based on the first session attribute, that the first session does not need to be handed over, send a handover request message to the second AN node, wherein the handover request message carries a session identity of the first session that does not need to be handed over, and the handover request message instructs the second AN node to trigger the CP to release the first session; or
before the UE is handed over from the first AN node to a second AN node, when the first AN node determines, based on the first session attribute, that the first session does not need to be handed over, send indication information to the CP, wherein the indication information instructs the CP to release the first session.

26. The system according to claim 23, wherein the first session attribute comprises a service area corresponding to each of the first session and the second session, and the first AN node is further configured to:
before the UE is handed over from the first AN node to a second AN node, send, to the second AN node, a handover request message that carries the session attribute, wherein the handover request message instructs the second AN node to determine a session that needs to be handed over and a session that does not need to be handed over, establish a radio resource corresponding to the session that needs to be handed over, and trigger the CP to release the session that does not need to be handed over; or
before the UE is handed over from the first AN node to a second AN node, determine, based on the session attribute, a session that does not need to be handed over, and send a handover request message to the second AN, wherein the handover request message carries context information of a session that needs to be handed over and a session identity of the session that does not need to be handed over, and the handover request message instructs the second AN node to establish a radio resource corresponding to the session that needs to be handed over, and trigger the CP to release the session that does not need to be handed over; or
before the UE is handed over from the first AN node to a second AN node, when the first AN node determines, based on the session attribute, a session that does not need to be handed over, send indication information to the CP, causing the CP to release a bearer of the session that does not need to be handed over.

27. The system according to claim 23, wherein the first AN node being configured to receive the first session attribute comprises the first AN node being configured to:
   receive, from the CP, a context establishment request that carries the first session attribute.

28. The system according to claim 23, wherein the first AN node being configured to receive the first session attribute comprises the first AN node being configured to:
   receive, from the CP, a context modification request that carries the first session attribute.

* * * * *

UNITED STATES PATENT AND TRADEMARK OFFICE
CERTIFICATE OF CORRECTION

PATENT NO. : 10,764,801 B2
APPLICATION NO. : 16/104324
DATED : September 1, 2020
INVENTOR(S) : Yan Li Page 1 of 1

It is certified that error appears in the above-identified patent and that said Letters Patent is hereby corrected as shown below:

In the Claims

In Column 36, Line 64, Claim 1, delete "constraint on a user packet received by the UE" and insert --constraint on a user packet to be received by, or received from, the UE--.

In Column 37, Lines 2-3, Claim 1, delete "constraint on a user packet received by the UE" and insert --constraint on a user packet to be received by, or received from, the UE--.

In Column 37, Line 21, Claim 5, delete "the a first session" and insert --a first session--.

In Column 37, Line 48, Claim 10, delete "to a user packet received by the UE" and insert --to a user packet to be received by, or received from, the UE--.

In Column 39, Lines 16-17, Claim 15, delete "constraint on a user packet received by the UE" and insert --constraint on a user packet to be received by, or received from, the UE--.

In Column 39, Lines 22-23, Claim 15, delete "constraint on a user packet received by the UE" and insert --constraint on a user packet to be received by, or received from, the UE--.

In Column 40, Lines 6-7, Claim 24, delete "to a user packet received by the UE" and insert --to a user packet to be received by, or received from, the UE--.

Signed and Sealed this
First Day of December, 2020

Andrei Iancu
*Director of the United States Patent and Trademark Office*